United States Patent
Cho

(10) Patent No.: US 9,225,934 B2
(45) Date of Patent: Dec. 29, 2015

(54) HEAD MOUNTED DISPLAY AND METHOD OF VIDEO COMMUNICATION USING THE SAME

(71) Applicant: LG ELECTRONICS INC., Seoul (KR)

(72) Inventor: Eunhyung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 270 days.

(21) Appl. No.: 13/772,597

(22) Filed: Feb. 21, 2013

(65) Prior Publication Data

US 2014/0184724 A1 Jul. 3, 2014

(30) Foreign Application Priority Data

Dec. 28, 2012 (KR) .................. 10-2012-0156555

(51) Int. Cl.
*H04N 7/14* (2006.01)
*G02B 27/01* (2006.01)

(52) U.S. Cl.
CPC .............. *H04N 7/144* (2013.01); *G02B 27/017* (2013.01); *G02B 2027/014* (2013.01); *G02B 2027/0127* (2013.01); *G02B 2027/0138* (2013.01); *G02B 2027/0187* (2013.01)

(58) Field of Classification Search
CPC .................................. G02B 27/10; H04N 5/225
USPC ............... 359/618, 630, 50; 348/14.08, 14.07
See application file for complete search history.

(56) References Cited

U.S. PATENT DOCUMENTS

| | | | |
|---|---|---|---|
| 5,936,610 A * | 8/1999 | Endo | 345/157 |
| 6,349,001 B1 * | 2/2002 | Spitzer | 359/618 |
| 6,507,356 B1 | 1/2003 | Jackel et al. | |
| 2004/0155956 A1 | 8/2004 | Libbey | |
| 2007/0064112 A1 * | 3/2007 | Chatting et al. | 348/207.99 |
| 2010/0238265 A1 | 9/2010 | White | |
| 2012/0075168 A1 * | 3/2012 | Osterhout et al. | 345/8 |
| 2012/0147131 A1 | 6/2012 | Yoon | |
| 2012/0154509 A1 * | 6/2012 | Erb | 348/14.03 |
| 2012/0218301 A1 * | 8/2012 | Miller | 345/633 |

* cited by examiner

*Primary Examiner* — Sonia Gay
(74) *Attorney, Agent, or Firm* — Birch, Stewart, Kolasch & Birch, LLP

(57) ABSTRACT

A head mounted display (HMD) comprises a display unit configured to output an image; a communication unit configured to transmit and receive video communication image data; a camera unit configured to take an image in a forward direction of the HMD; and a processor configured to control the display unit, the communication unit and the camera unit, wherein the processor is further configured to detect an image of a user wearing the HMD from the taken image, wherein the image of the user includes a camera area of the HMD, recognize an image of a partner from the received video communication image data, provide a video communication interface displaying the image of the partner, wherein the video communication interface displays the image of the partner corresponding to a position of the camera area of the HMD, and transmit a video communication image of the user from the taken image.

19 Claims, 18 Drawing Sheets

HEAD MOUNTED DISPLAY AND METHOD OF VIDEO COMMUNICATION USING THE SAME

This application claims the benefit of the Korean Patent Application No. 10-2012-0156555, filed on Dec. 28, 2012, which is hereby incorporated by reference as if fully set forth herein.

BACKGROUND OF THE INVENTION

1. Field of the Invention

The present disclosure relates to a head mount display and a method of video communication using the same, and more particularly, to a method of video communication based on a head mount display, in which an image of a user wearing the head mount display is detected for video communication.

2. Discussion of the Related Art

A head mounted display (HMD) means various video display devices that allow a user to wear on his/her head like glasses and view multimedia contents. With the trend of lightweight and miniaturization of portable devices, various wearable computers have been developed, and the HMD has been widely used. The HMD may provide various conveniences to user in combination with the augmented reality technology and the N screen technology in addition to a simple display function.

The HMD may be used in association with various external digital devices. The HMD may output contents of an external digital device by performing communication with the corresponding external digital device, and may receive a user input for the external digital device or perform interaction with the corresponding external digital device.

SUMMARY OF THE INVENTION

Accordingly, the present disclosure is directed to a head mounted display and a method of video communication using the same, which substantially obviate one or more problems due to limitations and disadvantages of the related art.

An object of the present disclosure is to provide a head mounted display and a method of video communication using the same, in which an image of a user wearing the HMD is provided to a partner to perform video communication.

Another object of the present disclosure is to provide a head mounted display and a method of video communication using the same, in which an image of a video communication partner is displayed in a video communication interface to correspond to a camera area of the HMD, whereby eye contact between a user and the video communication partner is made.

Other object of the present disclosure is to provide a head mounted display and a method of video communication using the same, in which an image substituting for an image of a user is provided to a video communication partner if the image of the user is not detected from a camera equipped in the HMD, whereby video communication may be performed between the user and the partner.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a head mounted display (HMD) according to the present disclosure comprises a display unit configured to output an image; a communication unit configured to transmit and receive video communication image data; a camera unit configured to take an image in a forward direction of the HMD; and a processor configured to control the display unit, the communication unit and the camera unit, wherein the processor is further configured to detect an image of a user wearing the HMD from the taken image, wherein the image of the user includes a camera area of the HMD, recognize an image of a partner from the received video communication image data, provide a video communication interface displaying the image of the partner, wherein the video communication interface displays the image of the partner corresponding to a position of the camera area of the HMD, and transmit a video communication image of the user from the taken image.

In another aspect of the present disclosure, a method of video communication using a head mounted display (HMD) comprises the steps of detecting an image of a user wearing the HMD from a taken image, wherein the image of the user includes a camera area of the HMD; recognizing an image of a partner from received video communication image data; providing a video communication interface displaying the image of the partner, wherein the video communication interface displays the image of the partner to a position of the camera area of the HMD; and transmitting a video communication image of the user from the taken image.

According to one embodiment of the present disclosure, since the user may perform video communication in a state that he/she wears the HMD, he/she may perform video communication without inconvenience caused as at least one hand carries the device.

Also, according to another embodiment of the present disclosure, the HMD may display an image of a partner in a video communication interface by allowing a user wearing the HMD to correspond to the image of the video communication partner, whereby more natural video communication may be performed.

According to another embodiment of the present disclosure, if eye contact between the user wearing the HMD and the video communication partner is not possible, the HMD may display a direction to which the user should move, so as to lead eye contact between the user and the video communication partner.

According to another embodiment of the present disclosure, if the image of the user wearing the HMD is not detected, an image substituting for the image of the user is transmitted to the video communication partner, whereby video communication may be performed between the user and the video communication partner.

According to another embodiment of the present disclosure, a target area of eye contact of the video communication partner is set on the basis of an image size of the partner in the video communication interface, whereby natural video communication may be performed between the user and the video communication partner.

More detailed advantageous effects will be described hereinafter.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the invention and together with the description serve to explain the principle of the disclosure. In the drawings.

DETAILED DESCRIPTION OF THE INVENTION

Reference will now be made in detail to the preferred embodiments of the present disclosure, examples of which are illustrated in the accompanying drawings. Wherever possible, the same reference numbers will be used throughout the drawings to refer to the same or like parts.

Although the terms used in the present disclosure are selected from generally known and used terms considering their functions in the present disclosure, the terms can be modified depending on intention of a person skilled in the art, practices, or the advent of new technology. Also, in special case, the terms mentioned in the description of the present disclosure may be selected by the applicant at his or her discretion, the detailed meanings of which are described in relevant parts of the description herein. Accordingly, the terms used herein should be understood not simply by the actual terms used but by the meaning lying within and the description disclosed herein.

The embodiments of the present disclosure shown in the accompanying drawings and described by the drawings are only exemplary, and technical spirits of the present disclosure and its main operation are not limited by such embodiments.

Figure 1:
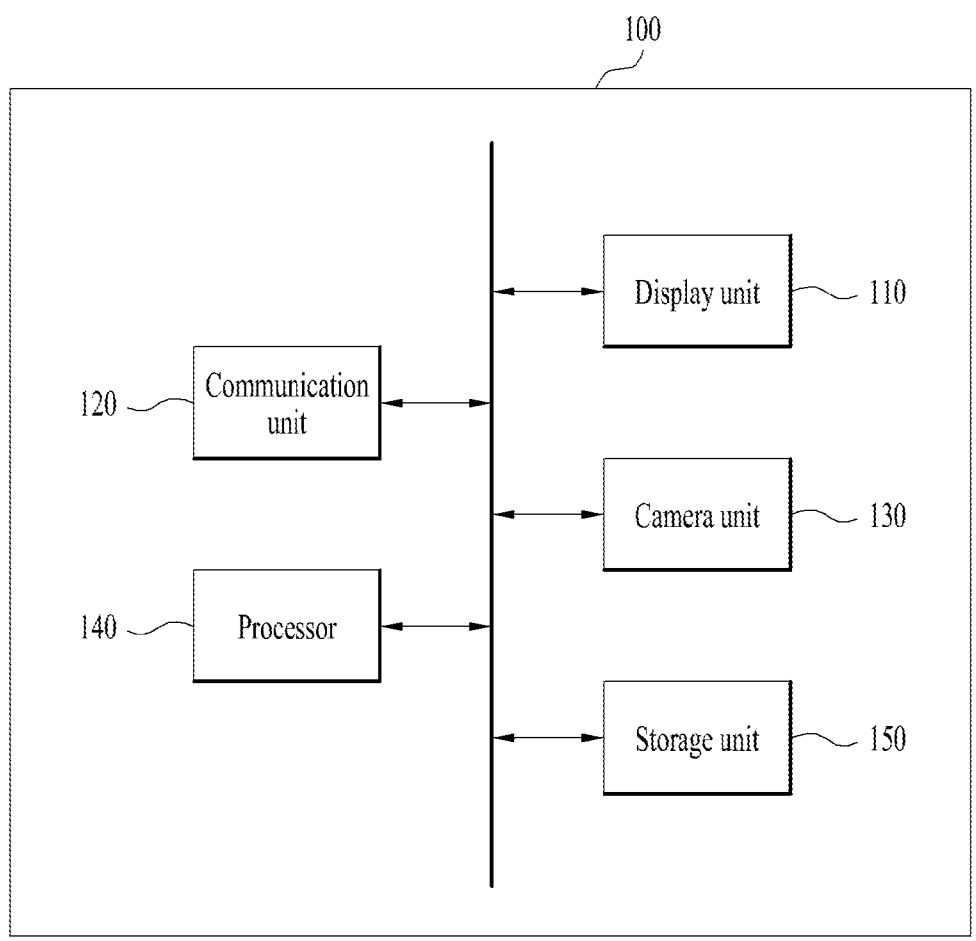
FIG. 1 is a functional block diagram illustrating a head mounted display.

FIG. 1 is a functional block diagram illustrating a head mounted display.

The head mounted display (hereinafter, referred to as 'HMD') 100 may include a display unit 110, a communication unit 120, a camera unit 130, a processor 140, and a storage unit 150.

First of all, the display unit 110 may display an image on the basis of a control command of the processor 140 of the HMD 100. For example, the display unit 110 may include a display screen to display an image on the display screen. Also, the display unit 110 may project an image on a specific position in a forward direction of the HMD 100 without a separate display screen. In this respect, the forward direction of the HMD 100 will be described with reference to FIG. 2.

For example, the display unit 110 may display a video communication interface. In this case, the display unit 110 may display an image of a partner, which is received from an external device through the communication unit 120, in a video communication interface. Also, the display unit 110 may display an image of a user wearing the HMD 100 in the video communication interface, wherein the image of the user is taken through the camera unit 130.

Herein, the video communication interface may represent a screen actually viewed by the user wearing the HMD 100, through the HMD 100 during video communication. Also, the video communication interface may represent an interface that outputs a real-time image received from a video communication partner. Also, the video communication interface may further output an image of the user wearing the HMD 100, which is taken in real-time. The video communication interface will be described later with reference to FIG. 4.

The communication unit 120 may transmit and receive data to and from the external device by performing communication using various protocols. Also, the communication unit 120 may transmit and receive digital data such as contents by accessing a network through a wire or wireless cable. For example, for wireless network connection, the communication unit 120 may use WLAN (Wireless LAN) (Wi-Fi), Wibro (Wireless broadband), Wimax (World Interoperability for Microwave Access), and HSDPA (High Speed Downlink Packet Access) communication specifications.

For example, the communication unit 120 may transmit and receive video communication image data to and from the external device (not shown). In this case, the video communication image data may be transmitted and received before video communication and during video communication. Also, the video communication image data may include a video communication image of the user and a video communication image of the partner.

The camera unit 130 may take an image in a forward direction of the HMD 100. In this case, the forward direction may mean a direction towards which the camera unit 130 is oriented. Also, the forward direction may represent a direction corresponding to a view of the user wearing the HMD 100. Also, the camera unit 130 may take an image within a viewing area corresponding to a view of the user wearing the HMD 100 and provide the taken image to the processor 140. The viewing area will be described with reference to FIG. 2.

The processor 140 may process data, control the aforementioned units of the HMD 100, and control data transmission and reception between the units.

In one embodiment, the processor 140 may detect the image of the user wearing the HMD 100, on the basis of the image taken through the camera unit 130. In more detail, the processor 140 may detect whether the image of the user exists in the image taken from the viewing area corresponding to a view of the user wearing the HMD 100, on the basis of the taken image. Also, the processor 140 may recognize the image of the partner from the video communication image data received through the communication unit 120. In this case, the recognized image of the partner may include an eye area and a face area. The image of the partner will be described with reference to FIG. 11. Also, the processor 140 may provide a video communication interface that displays the image of the partner in the display unit 110. Also, the processor 140 may transmit the video communication image of the user through the communication unit 120.

In another embodiment, if the image of the user wearing the HMD 100 is not detected from the taken image, the processor 140 may provide the display unit 110 with a notice representing that the image of the user cannot be detected. Also, if the image of the user wearing the HMD 100 is not detected from the taken image, the processor 140 may transmit a replacement image through the communication unit 120. Meanwhile, if at least a part of the camera area is not detected from the taken image, the processor 140 may provide the display unit 110 with the notice. Also, the processor 140 may display the image of the partner and the image of the user in the video communication interface at the same time.

The storage unit 140 may store various digital data such as audios, photos, moving pictures, and applications. The storage unit 140 may mean various digital data storage spaces such as a flash memory, a random access memory (RAM), and a solid state device (SSD).

Also, the storage unit 140 may temporarily store data received from the external device (not shown) through the communication unit 120. At this time, the storage unit 140 may be used for buffering for outputting the data or contents received from the external device (not shown) from the HMD 100.

The elements of the HMD 100 are shown in FIG. 1 by being logically identified from one another as blocks. Accordingly, the elements of the aforementioned HMD 100 may be provided as one chip or a plurality of chips in accordance with design of the device.

Figure 2:
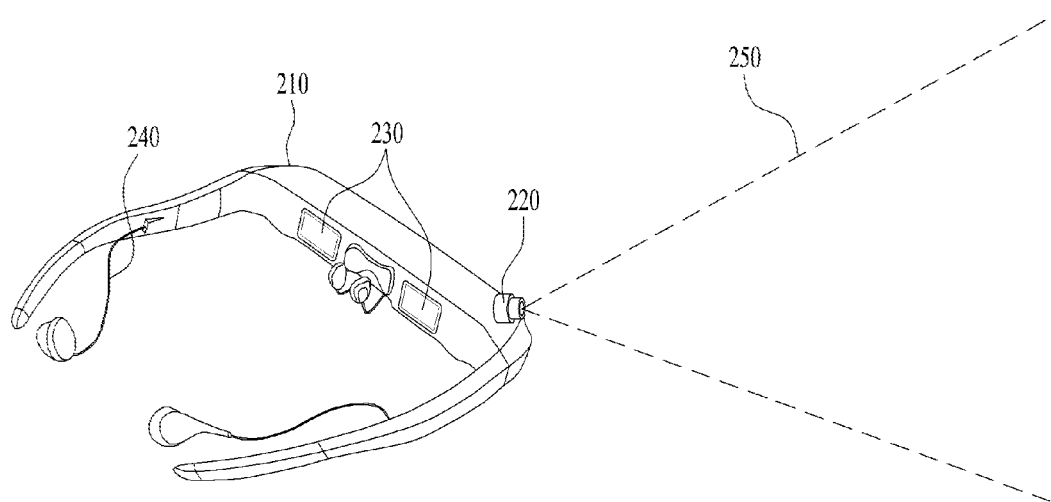
FIG. 2 is a diagram illustrating a head mounted display.

FIG. 2 is a diagram illustrating a head mounted display.

For example, the HMD 210 may perform video communication. In more detail, the HMD 210 is worn by the user and may perform video communication by using a camera 220, a display unit 230, an earphone 240, a microphone (not shown), which are provided in the HMD 210. The HMD 210 may take an image within a predetermined viewing area 250 through the camera 220, during video communication. In this case, the taken image may include an image taken through a reflector that may reflect the image of the user. For example, the reflector may include an object, such as a mirror, having a constant reflectivity or more. Also, the HMD 210 may display the image of the partner and the image of the user through the display unit 230. Also, the HMD 210 may provide the user with voice of the partner through the earphone 240. Moreover, the HMD 210 may receive voice of the user through the microphone (not shown).

Meanwhile, the camera 220 of the HMD 210 may have a viewing area 250 of a predetermined range. Also, the viewing area 250 represents a range of horizontal and vertical viewing angles that may be included in a constant screen during taking an image. Also, the viewing area 250 of the HMD 210 represents a previously set area corresponding to a view of the user wearing the HMD 210. In more detail, the viewing area 250 includes an area within a given angle in a forward direction of the HMD 210. For example, the given angle may include ±60° based on the center of a lens of the camera 220 provided in the HMD 210. Also, the camera 220 of the HMD 210 may be provided at a left side or right side of the HMD 210, or may be provided at the center of the HMD 210.

Also, if at least a part of an image of the user is detected from the viewing area 250 of the camera 220 provided in the HMD 210 during video communication, the HMD 210 may use the detected image of the user as a video communication image. Also, if at least a part of an image of the user is not detected from the viewing area 250 of the camera 220 provided in the HMD 210 during video communication, the HMD 210 may use an image which is previously stored, as a video communication image.

As a result, since the user may perform video communication in a state that he/she wears the HMD 210, the user may perform video communication with the partner while freely moving both hands without carrying a separate device.

As described above, if the user performs video communication using the HMD 210, the user wearing a head mound display 320 may perform communication with a video communication partner without eye contact with each other. In this case, concentration of video communication between the user and the partner may be deteriorated. Accordingly, in this specification, a method for video communication through eye contact between a user and a video communication partner is provided. The method for video communication through eye contact between a user and a video communication partner will be described with reference to FIG. 3 to FIG. 9.

Figure 3:
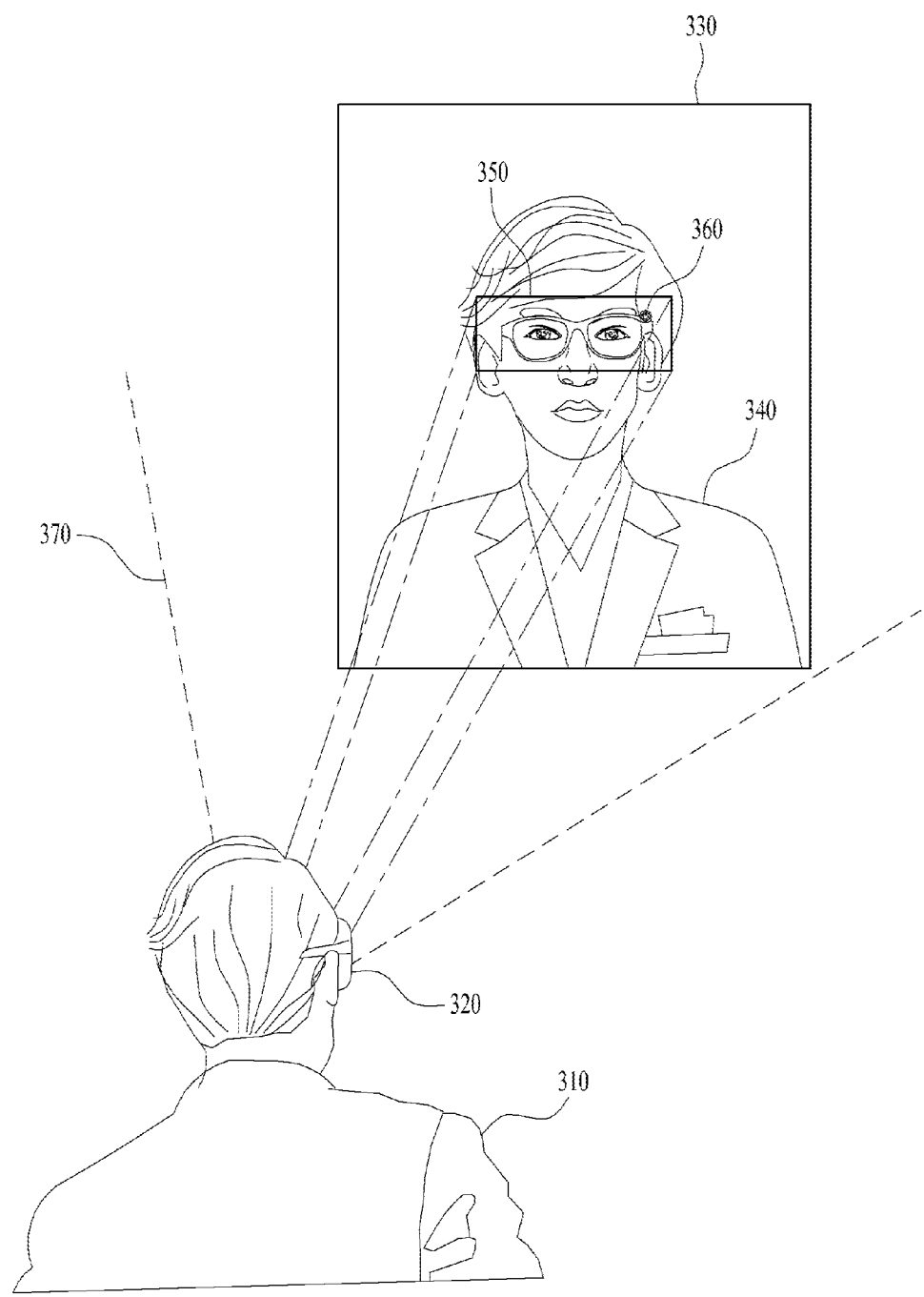
FIG. 3 is a diagram illustrating that an image of a user is detected using a head mounted display in accordance with the first embodiment of the present disclosure.

FIG. 3 is a diagram illustrating that an image of a user is detected using a head mounted display in accordance with the first embodiment of the present disclosure. In more detail, FIG. 3 illustrates that a forward image of a user 310 is detected using an HMD 320.

First of all, the HMD 320 may detect an input signal of the user 310 who desires to perform video communication, or an input signal of a video communication partner. For example, the input signal may be detected after the HMD 320 takes an image reflected in a reflector 330. Also, the input signal may be detected simultaneously with taking an image 340 of the user.

Next, the HMD 320 may take an image reflected in the reflector 330. In more detail, a camera (not shown) provided in the HMD 320 may take the image reflected in the reflector 330 located in a forward direction. Also, the camera (not shown) provided in the HMD 320 may take a viewing area 370 of the camera. In this case, the reflector 330 may represent an object having a certain reflex ratio or more to reflect the image of the user. For example, the reflector 330 may include a mirror. Also, the image reflected in the reflector 330 may include an image of a peripheral object as well as the image 340 of the user.

Next, the HMD 320 may detect the image 340 of the user wearing the HMD 320 from the taken image. In more detail, the HMD 320 may detect the image 340 of the user wearing the HMD 320 having certain definition from the taken image. In this respect, the HMD 320 may detect a camera area 350 of the HMD 320 from the taken image. Herein, the taken image may include an image of the user 310 wearing the HMD 320, which is reflected in the reflector 330. Herein, the camera area 350 may include at least one of a camera image 360 reflected in the reflector 330, HMD image reflected in the reflector 330, and the middle of the user's forehead reflected in the reflector 330. For example, referring to FIG. 3, the camera area 350 may correspond to an area that includes the HMD reflected in the reflector 330 and the camera equipped in the HMD 320.

Meanwhile, if the taken image includes a background image in addition to the image 340 of the user, the HMD 320 may detect only the image 340 of the user. This is because that the image 340 of the user is mainly required for video communication. For example, if peripheral objects such as chair, desk and sofa as well as the user 310 are included in the taken image, the HMD 320 may detect only the image of the user from the taken image.

According to the embodiment of FIG. 3, Since the HMD 320 may detect the image 340 of the user wearing the HMD 320, it may acquire the image of the user 310, which will be transmitted to the video communication partner.

Figure 4:
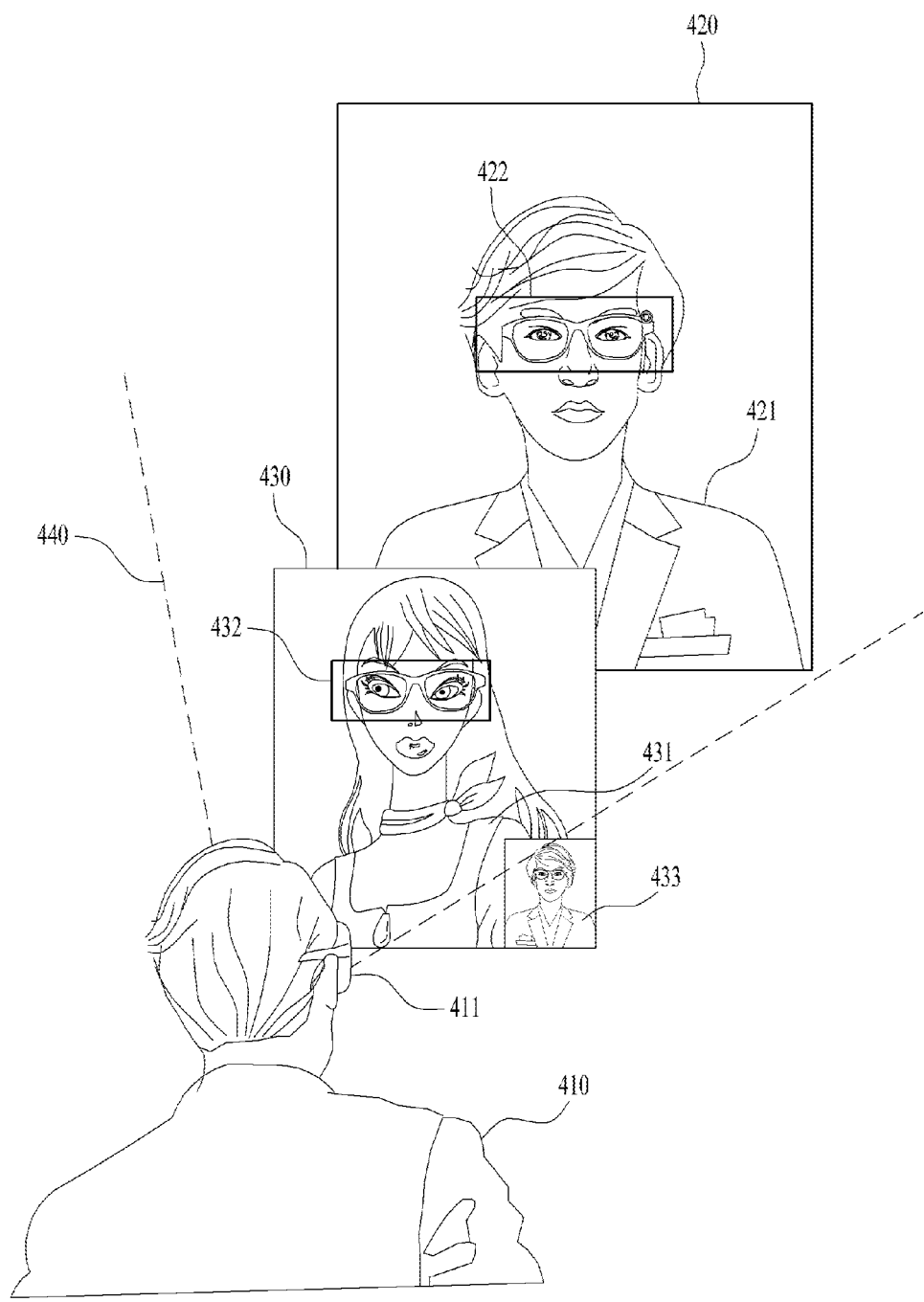
FIG. 4 is a diagram illustrating that a first embodiment of video communication using a head mounted display on the basis of an image of a user detected in FIG. 3.

FIG. 4 is a diagram illustrating that a first embodiment of video communication using a head mounted display on the basis of an image of a user detected in FIG. 3. In more detail, FIG. 4 illustrates that a user 410 wearing HMD 411 performs video communication with a video communication partner 431 while viewing a reflector 420.

First of all, the HMD 411 may receive video communication image data from the video communication partner. The video communication image data may be received by the communication unit 120 shown in FIG. 1. For example, the HMD 411 may receive the video communication image data before detecting the image of the user 410 wearing the HMD 411. Also, for example, the HMD 411 may receive the video communication image data after detecting the image of the user 410 wearing the HMD 411. Also, for example, the HMD 411 may receive the video communication image data simultaneously with detecting the image of the user 410 wearing the HMD 411.

Next, the HMD 411 may recognize an image 431 of the partner from the received video communication image data. This may be performed by the processor 140 shown in FIG. 1. In one embodiment, if a ratio of the image of the partner 431, which occupies the received video communication image data, corresponds to a predetermined range, the HMD 411 may recognize an eye area 432 of the partner from the image 431 of the partner. For example, the predetermined range may include a range that a face length of the partner occupies a height of the video communication image as much as ⅓. In another embodiment, if the ratio of the image 431 of the partner, which occupies the received video communication image data, does not correspond to the previously set range, the HMD 411 may recognize a face area (not shown) of the partner from the image 431 of the partner, This is because that it is difficult for the HMD 411 to recognize the eye area 432 if a ratio of a face of the partner, which occupies the received video communication image data, does not correspond to the previously set range. Accordingly, the HMD 411 may recognize the face area which is recognized more easily than the eye area 432. This will be described with reference to FIG. 11.

Next, the HMD 411 may provide a video communication interface 430 that displays the image 431 of the partner. The video communication interface 430 may display a scene actually viewed by the user 410 wearing the HMD 411, through the HMD 411 during video communication. For example, the HMD 411 may provide the video communication interface 430 through a display screen provided in a display unit (not shown). Also, the HMD 411 may display the video communication interface 430 in a specific position of a forward direction of the HMD 411 without a separate display screen.

Meanwhile, the HMD 411 may provide the video communication interface 430 that displays the image 431 of the partner, so that the image 431 of the partner may correspond to a position of a camera area 422 of the HMD 411.

In one embodiment, referring to FIG. 4, the HMD 411 may provide the image 431 of the partner, which is displayed in the video communication interface 430, in the same direction as the position of the camera area 422. Herein, the same direction may include that the HMD 411 worn by the user 410, the image 431 of the partner and the position of the camera area 422 are located collinearly. For example, referring to FIG. 4, the HMD 411 may display the eye area 432 of the partner and the position of the camera area 422 of the image 421 of the user in the same direction. In this case, the same direction may include that the eye area of the partner and the camera area 422 are located collinearly. Accordingly, the user 410 may perform video communication while performing eye contact with the eye area 432 of the video communication partner located in the same direction as that of the HMD 411. In this case, the locating collinearly may mean the same height.

In another embodiment, the HMD 411 may provide the video communication interface 430, which displays the image 431 of the partner, to be overlaid on the position of the camera area 422 of the HMD 411. In more detail, the HMD 411 may display the image 431 of the partner to be overlaid on the position of the camera area on the basis of at least one of depth and position where the video communication interface 430 is displayed. In this case, at least one of the depth and the position where the video communication interface 430 is displayed may be determined by setting of the user or a size of the image of the partner. In this case, the user 410 who views a reflector 420 in a forward direction may recognize the image 431 of the partner located directly before the reflector. For example, referring to FIG. 4, the HMD 411 may display the eye area 432 of the partner in the video communication interface 430 so that the eye area 432 may be overlaid on the camera area 422. In this case, at least one of the depth and the position where the video communication interface 430 is displayed may be determined on the basis of a pupil size of the user 410, an eye relief between an optical system for viewing the video communication interface 430 and eyes, a magnifying ratio, and a field of view (FOV).

Also, the HMD 411 may together display the image 431 of the video communication partner and the video communication image 433 of the user 410 in the video communication interface 430. In this case, together display may represent temporally simultaneous display, spatially simultaneous display, or time-spatially simultaneous display. The position of the video communication image 433 of the user in the video communication interface 430 may be determined on the basis of the predetermined position or the position based on setting of the user. For example, the predetermined position may correspond to one of lower, upper, left and right sides of the video communication interface 430. For example, referring to FIG. 4, the previously set position may correspond to a right lower corner of the video communication interface 430. Meanwhile, the video communication image 433 of the user 410 may correspond to a reversed image of the image 421 of the user from side to side. This will be described with reference to FIG. 12.

Meanwhile, the HMD 411 may perform video communication by transmitting the video communication image 433 of the user 410, which is provided from the taken image, to the video communication partner. In this case, the video communication image 433 of the user may correspond to the peripheral area that includes the camera area 422 of the HMD 411 in the taken image. For example, referring to FIG. 4, the video communication image 433 of the user may correspond to the area that includes a face of the user.

Also, the HMD 411 may transmit the video communication image 433 of the user 410 to the video communication partner in real time and receive the video communication image from the video communication partner in real time. As a result, the user 410 and the video communication partner may perform video communication while identifying their face in real time.

According to the embodiment of FIG. 4, since eye contact may be performed between the user and the video communication partner, more natural communication may be performed during video communication.

Figure 5:
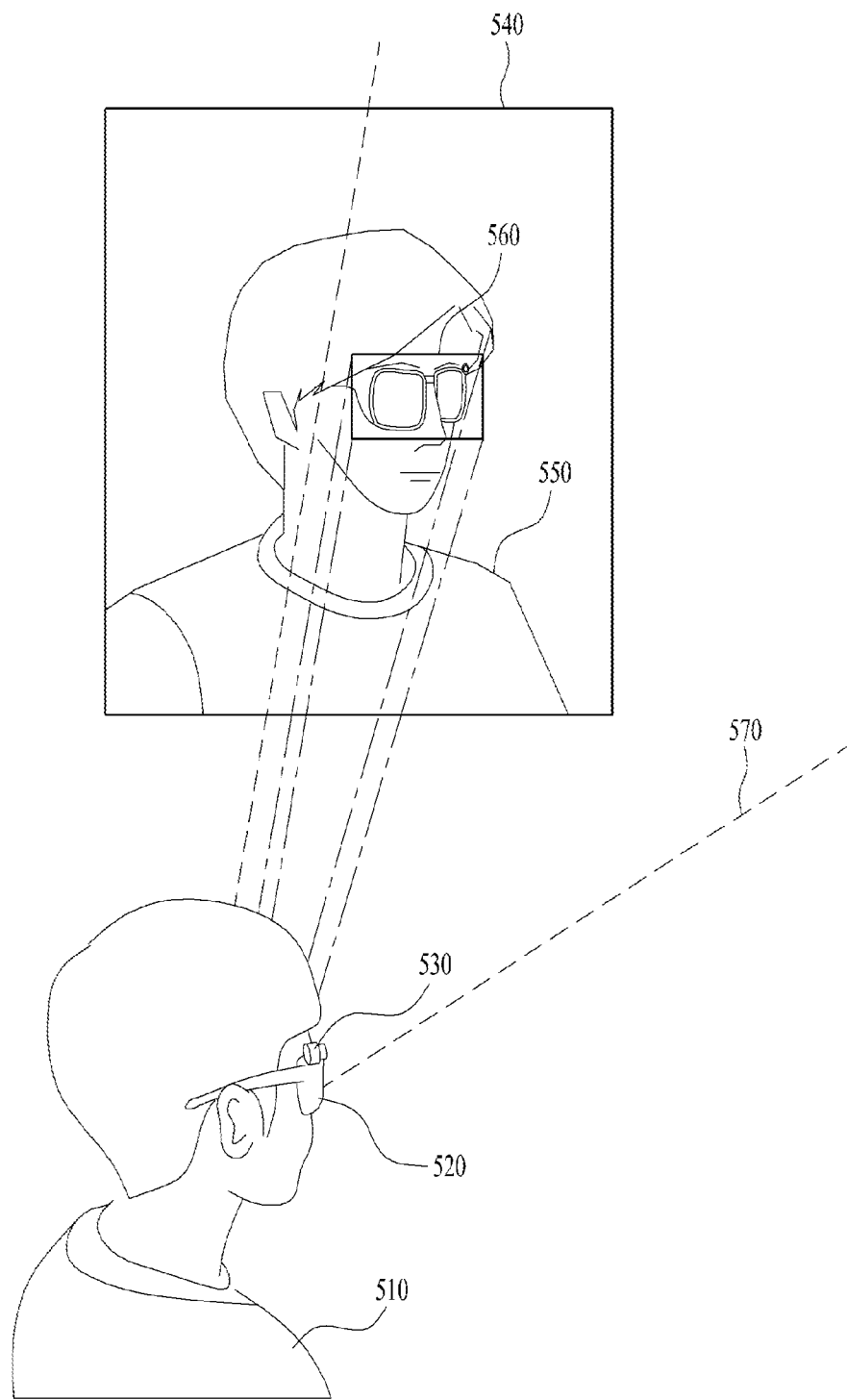
FIG. 5 is a diagram illustrating that an image of a user is detected using a head mounted display in accordance with the second embodiment of the present disclosure.
Figure 6A:
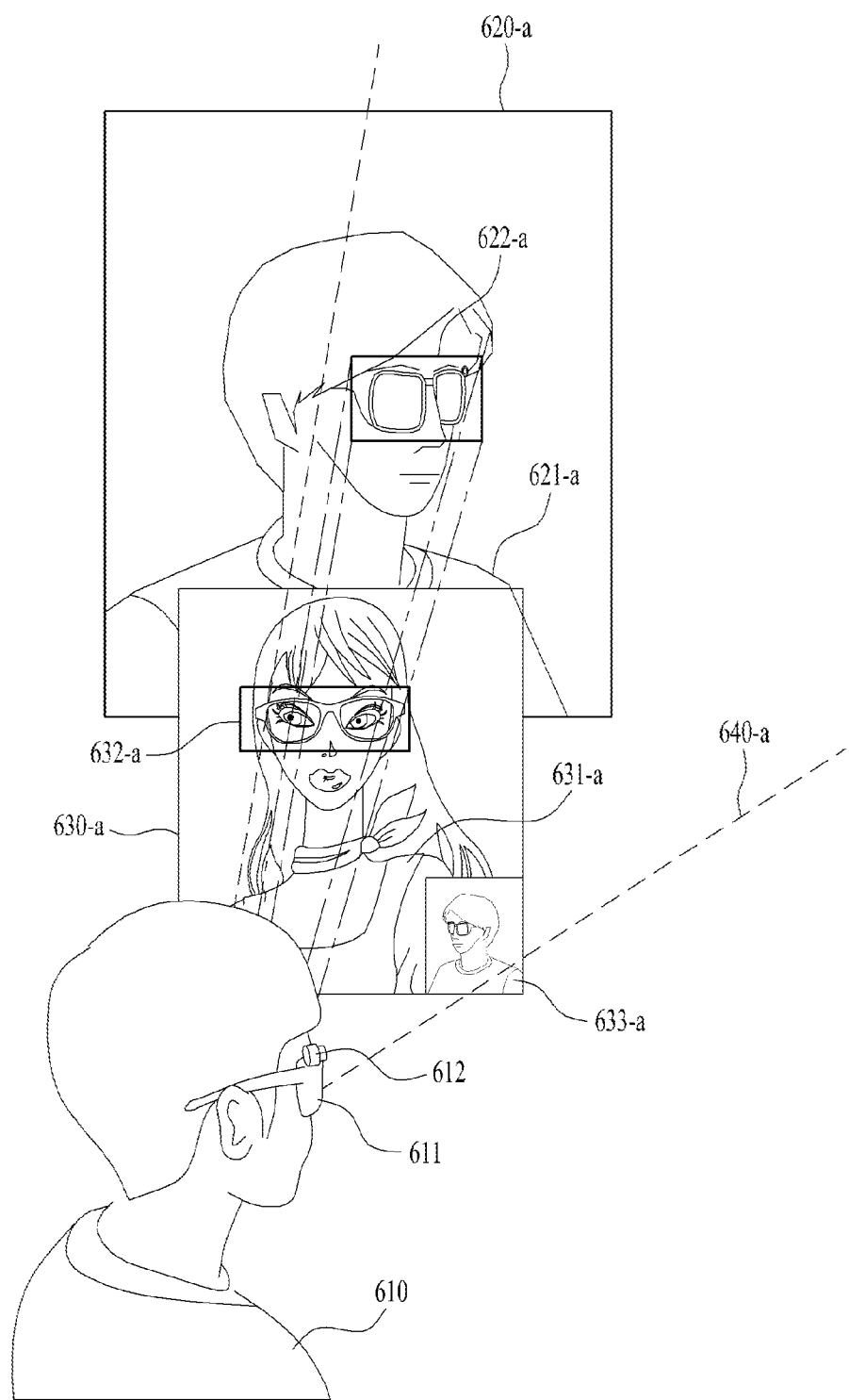
FIGS. 6A & 6B are diagrams illustrating that a second embodiment of video communication using a head mounted display on the basis of an image of a user detected in FIG. 5.
Figure 6B:
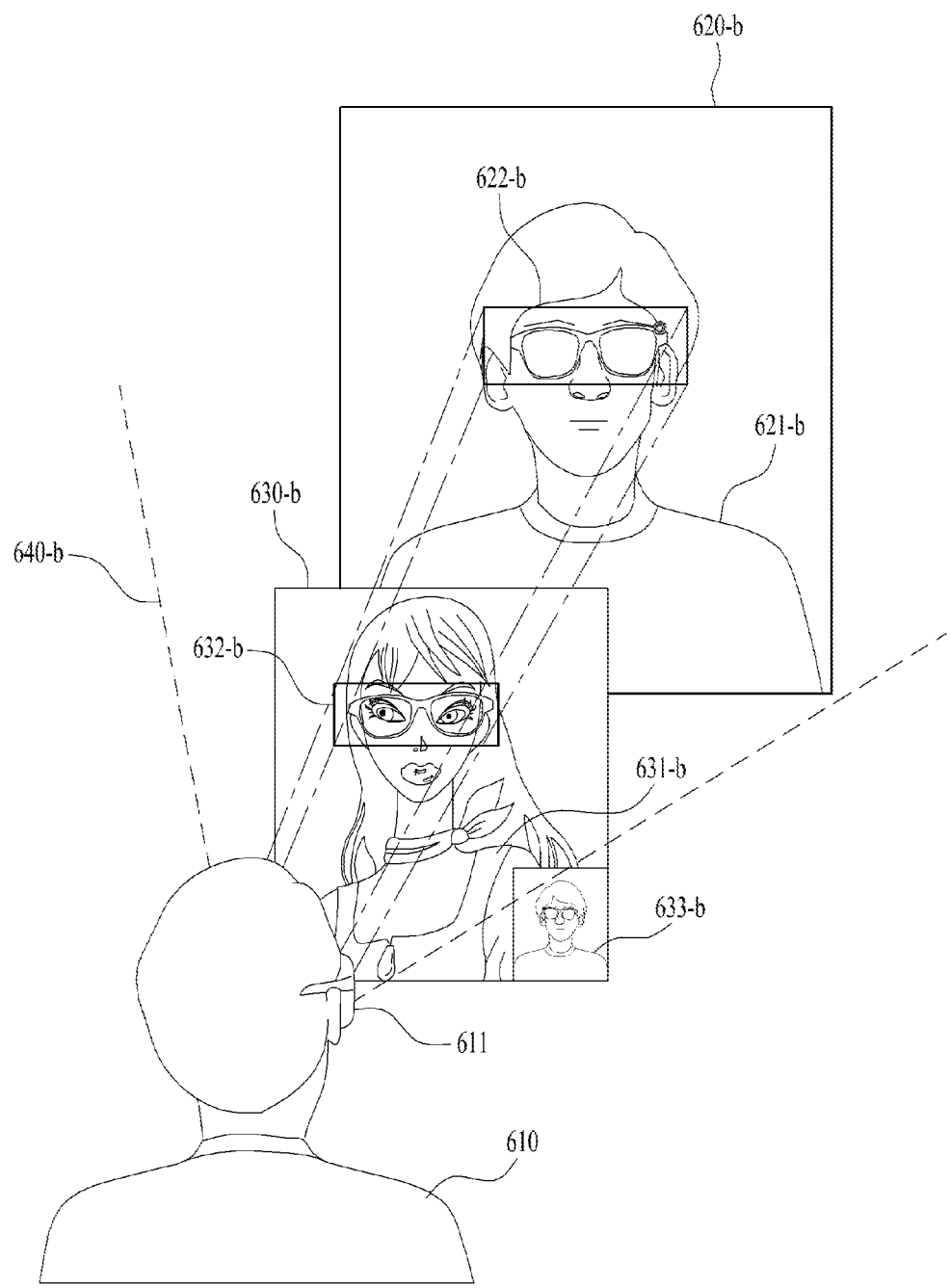

FIG. 5 is a diagram illustrating that an image of a user is detected using a head mounted display in accordance with the second embodiment of the present disclosure. In more detail, FIG. 5 illustrates that an image 550 of a user wearing an HMD 520 is displayed in a reflector 540 located within a viewing area of a camera 530 of the HMD 520.

First of all, as described in FIG. 3, the HMD 520 may detect an input signal of the user 510 who desires to perform video communication, or an input signal of a video communication partner. Next, the HMD 520 may take an image reflected in the reflector 540. At this time, the taken image may include an image taken within a viewing area 570 of the camera 530 equipped in the HMD 520 even though the reflector 540 is not located in a forward direction of the camera 530 equipped in the HMD 520. As described in FIG. 2, for example, the viewing area 570 may include a range from +60° to −60° on the basis of the center of the camera 530 equipped in the HMD 520. For example, referring to FIG. 5, the taken image may correspond to the image taken in the camera 530 in a state that the user 510 rotates the reflector 540 at 30° to the right side based on forward viewing of the reflector 540.

Next, the HMD 520 may detect the image 550 of the user wearing the HMD 520 from the taken image. In this case, the taken image may include an image of the user 510 wearing the HMD 520, which is reflected in the reflector 540. Also, the HMD 520 may detect a camera area 560 of the HMD 520 from the taken image. In this case, the camera 530 of the HMD 520 may detect the image 550 of the user, in which the HMD 520 is partially displayed, unlike FIG. 3. Also, the camera area shown in FIG. 3 includes all of the HMD, whereas the camera area 560 of FIG. 5 may represent a part of the HMD 520.

Meanwhile, if the taken image includes a background image in addition to the image 550 of the user, the HMD 520 may detect only the image 550 of the user. For example, referring to FIG. 5, the user 510 may be in a state that he/she views a side of the reflector 540. In this case, the image 550 of the user, which is reflected in the reflector 540, may be concentrated on one side of the viewing area 570 of the camera 530 of the HMD 520. In this case, since the image 550 of the user is mainly required for video communication, the HMD 520 may detect only the image 550 of the user from the taken image.

Through the embodiment of FIG. 5, since the HMD 520 may detect the image 550 of the user wearing the HMD 520, it may acquire the image 550 of the user, which will be transmitted to the video communication partner.

FIG. 6 is a diagram illustrating that a second embodiment of video communication using a head mounted display on the basis of an image of a user detected in FIG. 5. In more detail, FIG. 6 illustrates that a user 610 wearing HMD 611 performs video communication with a video communication partner in a state that the user is oriented towards a side of a reflector 620. This may be performed by the communication unit 120 shown in FIG. 1.

First of all, as described in FIG. 4, the HMD 611 may receive video communication image data from the video communication partner. Next, the HMD 611 may recognize an image 631 of the partner from the received video communication image data.

Next, the HMD 611 may provide a video communication interface 630 that displays the image 631 of the partner. Also, the HMD 611 may provide the video communication interface 630 that displays the image 631 of the partner, so that the image 631 of the partner may correspond to the position of the camera area 622 of the HMD 611.

In one embodiment, as described in FIG. 4, the HMD 611 may provide the video communication interface 630 so that the image 631 of the partner is located in the same direction as that of the camera area 622. In more detail, the HMD 611 may display the video communication interface 630 so that an eye area 632 of the partner is located in the same direction as that of the position of the camera area 622 of the image 621 of the user. For example, referring to FIG. 6(a), the HMD 611 may be located towards a side of a reflector 620-a. At this time, the HMD 611 may display the video communication interface 630 in the same direction as the position of the camera area 622-a. In this case, the video communication interface 630-a may be located at the side towards which the HMD 611 is oriented. Accordingly, eye contact between the user 610 wearing the HMD 611 and the video communication interface 630-a may not be performed. In this respect, the HMD 611 may display a notice (not shown) indicating that the eye contact is not performed, in the video communication interface 630-a, whereby the HMD 610 may be oriented towards the reflector 620-a. In this case, the notice (not shown) may represent a direction or distance to which the HMD 611 should move, so that the video communication interface 630 may be located at the front of the HMD 611. This will be described later with reference to FIG. 11. Accordingly, the user 610 may recognize that eye contact is not performed, and may move or rotate the FWD 611 towards the reflector 620-a. Next, referring to FIG. 6(b), the HMD 611 may be located towards the reflector 620-b through rotation or movement. Accordingly, in this case, as described in FIG. 4, the HMD 611 may display the video communication interface 630-b so that the eye area 632-b of the partner may be located in the same position as the position of the camera area 622-b of the image 621-b of the user. As a result, the user 610 wearing the HMD 611 may perform video communication through eye contact by correcting the direction or position in real time even though eye contact between the user 610 and the video communication partner is not performed.

In another embodiment, the HMD 611 may provide the video communication interface 630, which displays the image 631 of the partner, to be overlaid on the position of the camera area 622 of the HMD 611. In this case, at least one of the depth and the position where the video communication interface 630 is displayed may be determined by setting of the user or a size of the image of the partner. For example, referring to FIG. 6(a), the HMD 611 may be located towards the side of the reflector 620-a. At this time, the HMD 611 may provide a video communication interface 630-a so that an image 631-a of the partner may be overlaid on a camera area 622-a of the HMD 611. In this case, the image of the HMD may partially be displayed in the camera area 622-a unlike the camera area of FIG. 4. Accordingly, the HMD 611 may provide the video communication interface 630-a within a viewing area 640-a of the camera 612 equipped in the HMD 611. However, the HMD 611 may provide the video communication interface 630-a at the side of the viewing area 640-a. Accordingly, eye contact between the user 610 wearing the HMD 611 and the video communication partner may not be performed. In this respect, the HMD 611 may display a notice (not shown) indicating that eye contact is not performed, in the video communication interface 630-a, whereby the HMD 610 may be oriented towards the reflector 620-a. In this case, the user 610 may recognize that the eye contact is not performed, and may move or rotate the HMD 611 towards the reflector 620-*a*. Next, referring to FIG. 6(*b*), the HMD 611 may be located towards the reflector 620-*b* through rotation or movement. Accordingly, in this case, as described in FIG. 4, the HMD 611 may provide the video communication interface 630-*b*, which displays the image 631-*b* of the partner, to be overlaid on the camera area 622-*b*. As a result, the user 610 wearing the HMD 611 may perform video communication through eye contact by correcting the direction or position in real time even though the eye contact between the user 610 and the video communication partner is not performed.

Meanwhile, the HMD 611 may together display the image 631 of the video communication partner and the video communication image 633 of the user 610 in the video communication interface 630. In this case, the video communication image 633 of the user 610, which is displayed in the video communication interface 630, may represent the image of the user, which is transmitted in real time. For example, referring to FIG. 6(*a*), since the user 610 wearing the HMD 611 is oriented towards the side of the reflector 620-*a*, the video communication image 633-*a* of the user 610, which is displayed, may represent a side image of the user 610. Next, for example, referring to FIG. 6(*b*), since the user 610 wearing the HMD 611 is oriented towards the front of the reflector 620-*b*, the video communication image 633-*b* of the user 610, which is displayed, may represent a front image of the user 610. As a result, the video communication partner may identify the image of the user 610 in real time.

Also, the HMD 611 may display the image 621 of the user in the video communication interface 630 through reverse in left and right direction. For example, referring to FIG. 6, the HMD 611 may display the video communication image 633, which is reversed in left and right direction from the image 621 of the user, in the video communication interface 630. This will be described later with reference to FIG. 13.

Figure 7A:
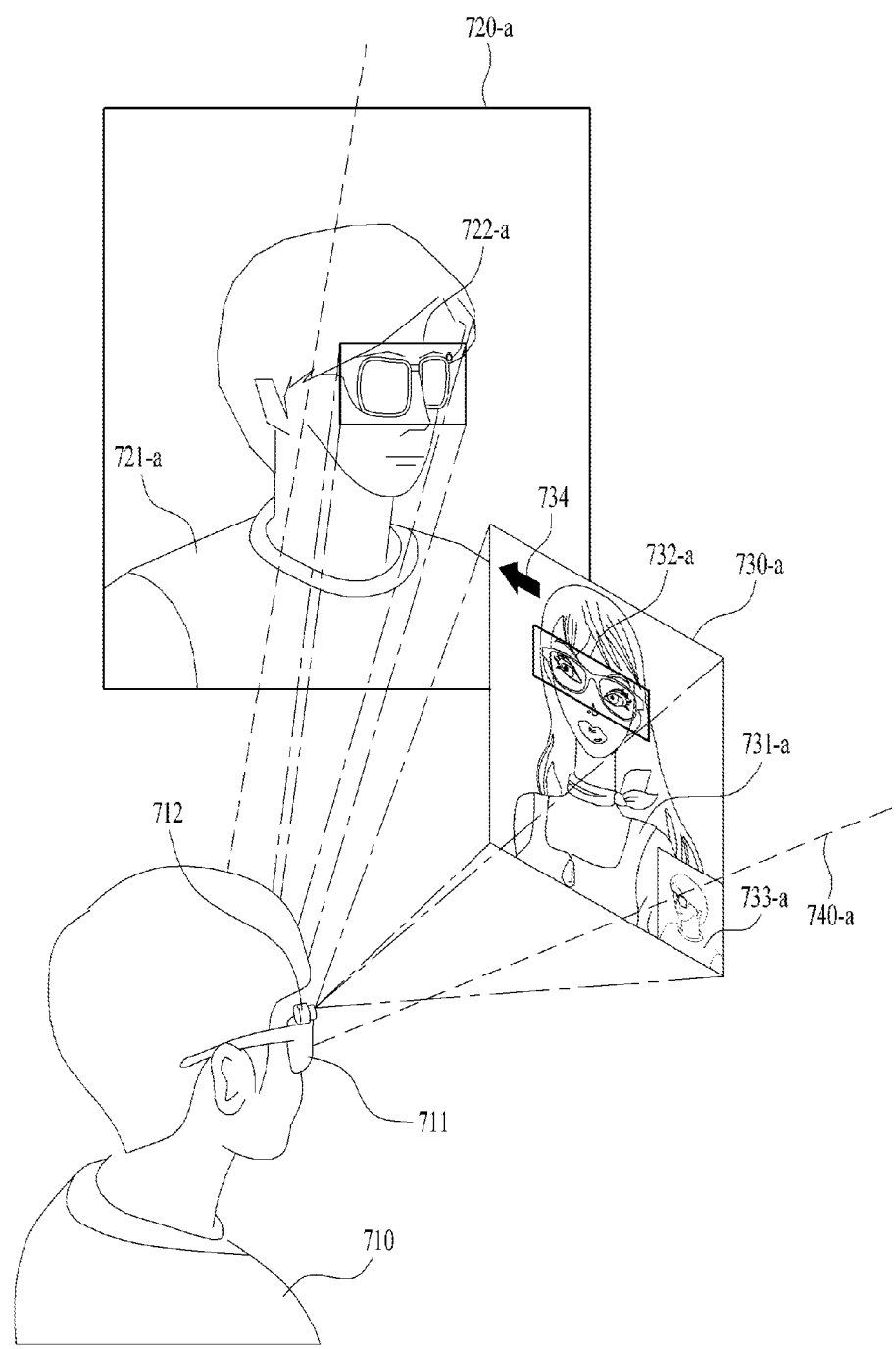
FIGS. 7A & 7B are diagrams illustrating that a third embodiment of video communication using a head mounted display on the basis of an image of a user detected in FIG. 5.
Figure 7B:
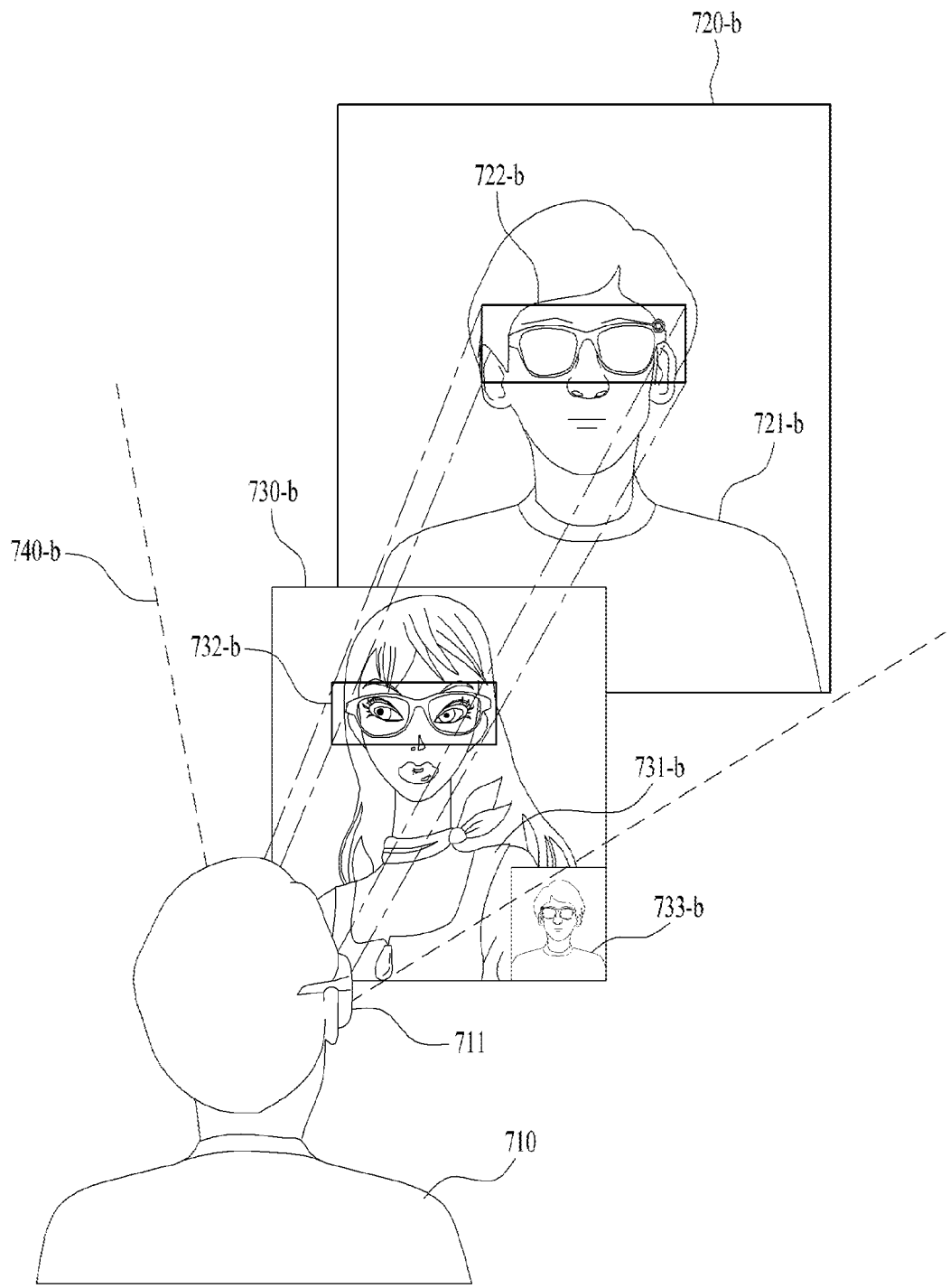

FIG. 7 is a diagram illustrating that a third embodiment of video communication using a head mounted display on the basis of an image of a user detected in FIG. 5. In more detail, FIG. 7 illustrates that a user 710 wearing HMD 711 performs video communication with a video communication partner in a state that the user 710 is oriented towards a side of a reflector 720. This may be performed by the communication unit 120 shown in FIG. 1.

First of all, as described in FIG. 4, the HMD 711 may receive video communication image data from the video communication partner. Next, the HMD 711 may recognize an image 731 of the partner from the received video communication image data.

Next, the HMD 711 may provide a video communication interface 730 that displays the image 731 of the partner. For example, referring to FIG. 7(*a*), the HMD 711 may provide a video communication interface 730-*a* in which an image 731-*a* of the partner is displayed in a viewing area 740 of a camera 712 equipped in the HMD 711. In more detail, the HMD 711 may provide the video communication interface 730-*a* in which the image 731-*a* of the partner is displayed in a forward direction of the HMD 711. In this case, the eyes of the user 710 wearing the HMD 711 are oriented towards a forward direction of the HMD 711, and the HMD 711 may transmit a side image 721 of the user to the video communication partner as the video communication image. Accordingly, video communication may be performed without eye contact between the user 710 and the video communication partner. At this time, the HMD 711 may display a notice 734 indicating that eye contact is not performed, on the video communication interface 730-*a*. For example, referring to FIG. 7(*a*), the notice 734 may include a type of an arrow. This will be described later with reference to FIG. 11. Accordingly, the user 710 may recognize that eye contact is not performed, and may move or rotate towards the reflector 720-*a*. Next, referring to FIG. 7(*b*), the HMD 711 may be located towards the reflector 720-*b* through rotation or movement. Accordingly, in this case, as described in FIG. 4, the HMD 711 may provide the video communication interface 730-*b*, which displays the image 731-*b* of the partner, so that an eye area 732-*b* of the partner may be located in the same position as the position of the camera area 722-*b* of the image 721-*b* of the user. As a result, as described in FIG. 4, the HMD 711 may provide the video communication interface 730, which displays the image 731-*b* of the partner, to be overlaid on the position of the camera area 722-*b* of the HMD 711.

Also, the HMD 711 may display the image 721 of the user in the video communication interface 730 by reversing the image 721 in left and right direction. For example, referring to FIG. 7(*a*), if the user 710 wearing the HMD 711 is oriented towards the right side, the user may also be oriented towards the right side in his/her image 721-*a*. In this case, the HMD 711 may provide the video communication interface 731-*a*, which displays a video communication image 733-*a*, by reversing the image 721-*a* of the user in left and right direction.

According to the embodiment of FIG. 7, if there is difficulty in eye contact between the user and the video communication partner, the HMD 711 may guide movement of the user for eye contact, thereby enabling natural video communication.

Figure 8:
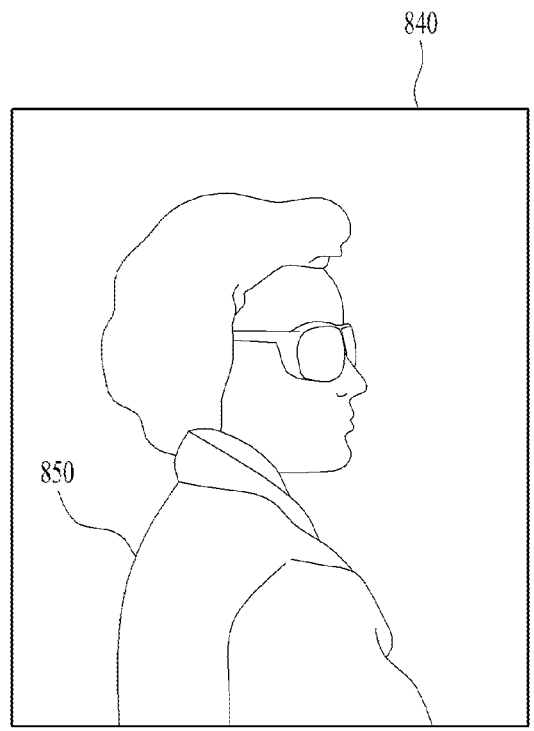
FIG. 8 is a diagram illustrating that an image of a user is detected using a head mounted display in accordance with the third embodiment of the present disclosure.
Figure 8:
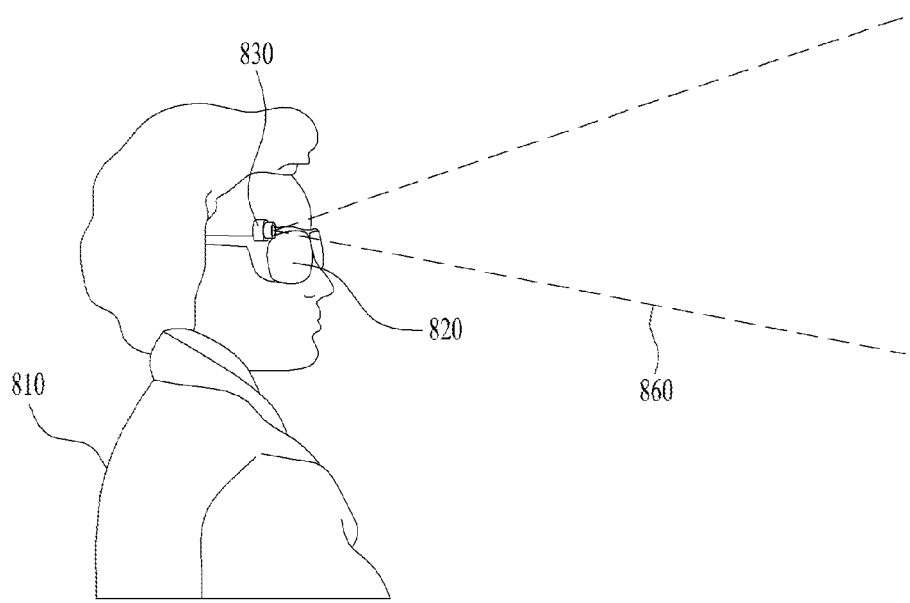

FIG. 8 is a diagram illustrating that an image of a user is detected using a head mounted display in accordance with the third embodiment of the present disclosure. In more detail, FIG. 8 illustrates that an HMD 820 fails to detect an image 850 of a user within a viewing area 860.

First of all, as described in FIG. 3, the HMD 820 may detect an input signal of the user 810 who desires to perform video communication, or an input signal of a video communication partner.

Next, the HMD 820 may take the viewing area 860 through a camera 830 equipped therein. In this case, if there is no reflector 840 within the viewing area 860 of the camera 830, the HMD 820 cannot detect the image of the user 850 from the taken image. For example, the case where there is no reflector 840 within the viewing area 860 of the camera 830 may include the case where there is no reflector 840 within the range of ±60° based on the center of a lens of the camera 830 equipped in the HMD 820. Referring to FIG. 8, the HMD 820 may correspond to the state where the HMD 820 is rotated at 90° to the right side with respect to the reflector 840. In this case, if the viewing area 860 is within the range of ±60° based on the center of the lens of the camera 830, the HMD 820 cannot detect a real time image of the user 810, which will be transmitted to the video communication partner.

Figure 9:
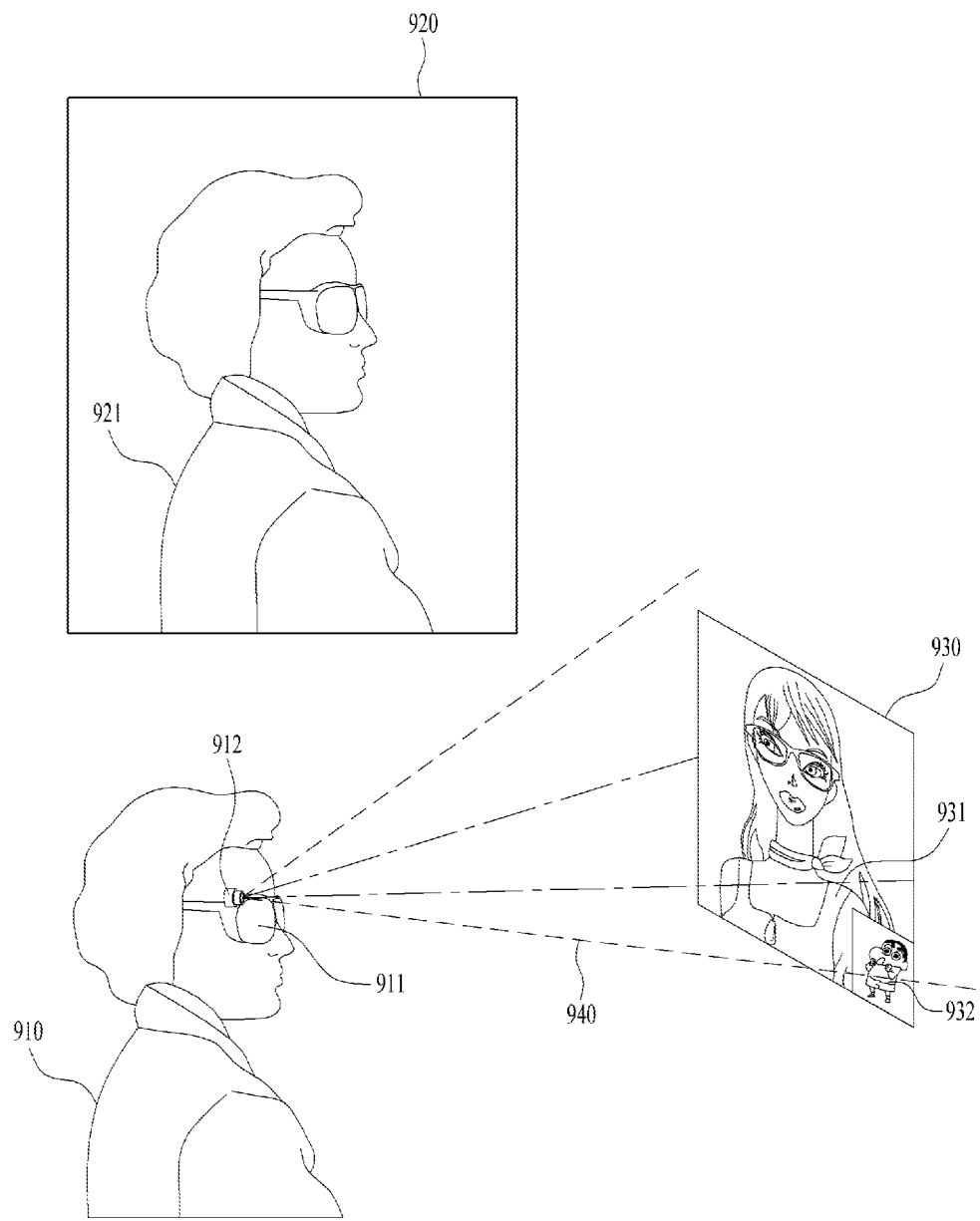
FIG. 9 is a diagram illustrating that a fourth embodiment of video communication using a head mounted display on the basis of an image of a user detected in FIG. 8.

FIG. 9 is a diagram illustrating that a fourth embodiment of video communication using a head mounted display on the basis of an image of a user defected in FIG. 8. In more detail, FIG. 9 illustrates that a user 910 wearing an HMD 911 performs video communication with a video communication partner by transmitting a replacement image 932 to the video communication partner. This may be performed by the communication unit 120 shown in FIG. 1.

First of all, as described in FIG. 4, the HMD 911 may receive video communication image data from the video communication partner. Next, as described in FIG. 4, the HMD 911 may recognize an image 931 of the partner from the received video communication image data.

Next, the HMD 911 may provide a video communication interface 930 that displays the image 931 of the partner. In this case, since the HMD 911 cannot detect its camera area, it may display the video communication interface 930, which displays the image 931 of the partner, in a state that the image 931 of the partner does not correspond to the camera area. At this time, the HMD 911 may display the video communication interface 930 within its viewing area 940. In this case, since the HMD 911 cannot detect an image 921 of the user, it may transmit a replacement image 932, which can substitute for the image 921 of the user, to the video communication partner. For example, the replacement image 932 may include an image of the user, which is previously stored, an image of an entertainer, and a character image. Also, the HMD 911 may perform video communication by displaying the image 931 of the partner and the replacement image 932 in the video communication interface 930 at the same time.

In this respect, when the HMD 911 cannot detect the image of the user from the taken image, HMD 911 may provide a notice (not shown) indicating that the image of the user is not detected. In this case, the notice may represent a direction or distance to which the image of the user should move towards a reflector 920 so that the image of the user may be detected by the camera 912 equipped in the HMD 911. This will be described later with reference to FIG. 11. Meanwhile, if the HMD 911 recognizes that the image of the user is not detected, before video communication starts, it may provide the user 910 with an interface that determines whether to transmit the replacement image 932. This will be described with reference to FIG. 10.

According to the embodiment of FIG. 9, even though the HMD cannot transmit the real time image of the user to the video communication partner, HMD may perform video communication with the video communication partner by transmitting the replacement image.

Figure 10:
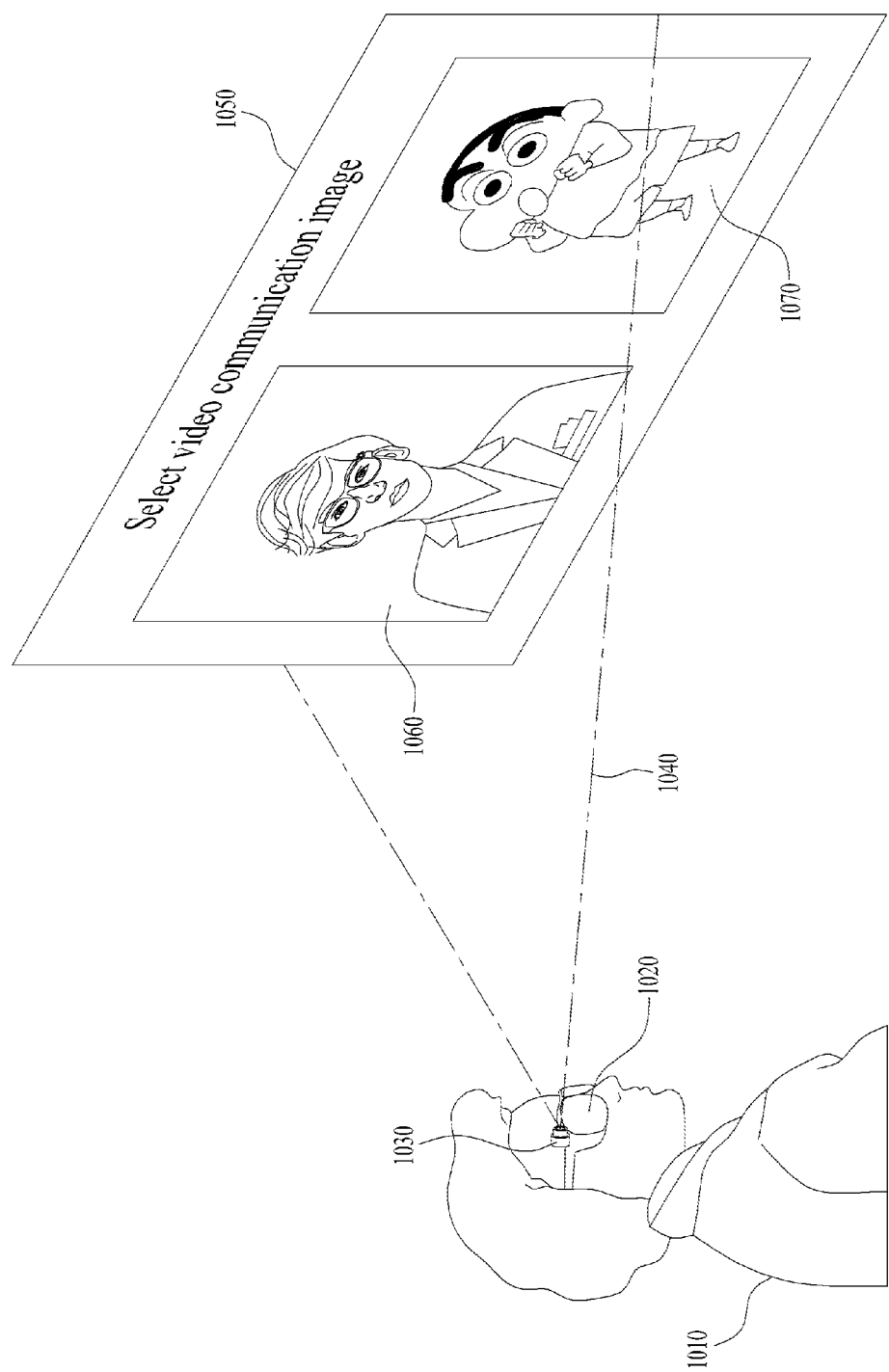
FIG. 10 is a diagram illustrating that an example of an interface that selects a video communication image.

FIG. 10 is a diagram illustrating that an example of an interface that selects a video communication image. In more detail, FIG. 10 illustrates that an interface, which selects a video communication image, is provided.

First of all, an HMD 1020 may provide a user 1010 with a video communication image determination interface 1050 before video communication starts. Also, the HMD 1020 may provide the user 1010 with the video communication image determination interface 1050 during video communication. This is because that the user 1010 may perform video communication while moving. Next, the HMD 1020 may detect a user input that determines whether to transmit a taken image 1060 or a replacement image 1070 from the user 1010 to a video communication partner (not shown). In this case, the user input may include a voice input and a gesture input. Also, the replacement image 1070 may include an image of a user, which is previously stored, an entertainer image, or a character image. For example, the character image may be used as the replacement image 1070 in FIG. 10.

Meanwhile, the HMD 1020 may determine a position where the video communication image of the user 1010 or the replacement 1070 will be displayed in a video communication interface (not shown), through the video communication image determination interface 1050. For example, the HMD 1020 may determine that the video communication image may be displayed at one of lower, upper, left and right sides of the video communication interface (not shown). Also, for example, the HMD 1020 may display an image (not shown) of the partner and the video communication image of the user by arranging them horizontally or vertically at the same size.

According to the embodiment of FIG. 10, when the HMD 1020 cannot detect the image 1060 of the user through a camera 1030 equipped in the HMD 1020, HMD 1020 may perform video communication by transmitting the replacement image 1070. Also, even though the HMD 1020 may detect the image 1060 of the user through the camera 1030 equipped in the HMD 1020, if the user 1010 is not in such a condition for detection, the HMD 1020 may transmit the replacement image 1070 instead of the image 1060 of the user.

Figure 11:
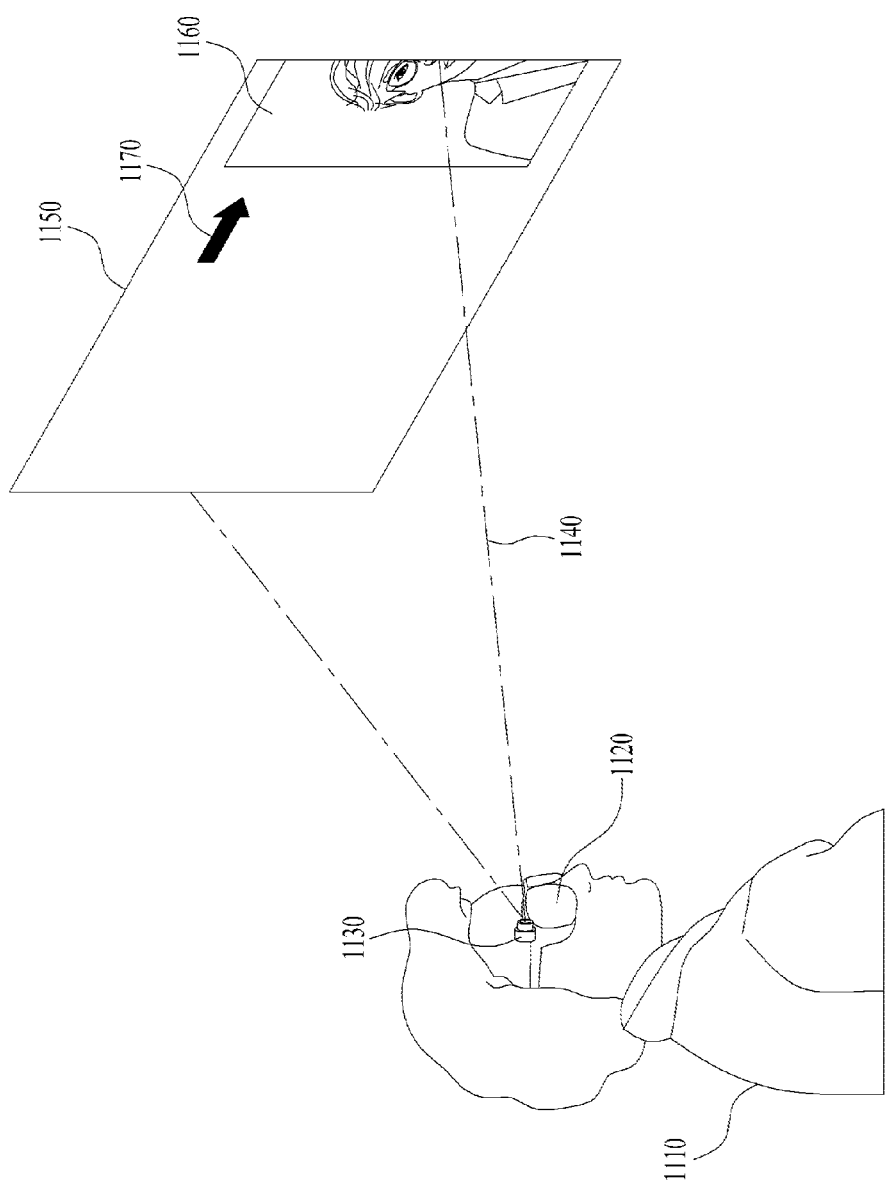
FIG. 11 is a diagram illustrating an example of a notice corresponding to a case where at least a part of an image of a user is not detected.

FIG. 11 is a diagram illustrating an example of a notice corresponding to a case where at least a part of an image of a user is not detected. In more detail, FIG. 11 illustrates a notice provided to a user when at least a part of an image of a user is not detected from a taken image.

In one embodiment, an HMD 1120 may detect a part of an image 1160 of a user from an image, which is taken from a viewing area 1140 of a camera 1130. In this case, as shown in FIG. 5, since the HMD 1120 may detect a part of an image 1160 of a user, it may recognize a position of a reflector (not shown) of the camera 1130. Accordingly, the HMD 1120 may provide a notice 1170 indicating that at least a part of the image of the user cannot be detected. In this case, the notice 1170 may represent a direction or position to which the user 1110 should move to detect the image. The notice 1170 may represent a direction to which the user 1010 should move (rotate) by using an arrow. For example, referring to FIG. 11, the notice 1170 may represent that the user 1110 should move (rotate) to the right side. Also, the notice 1170 may include an icon (not shown) indicating a distance to which the user 1110 should move. Also, the notice 1170 may be represented by another icon not arrow.

In another embodiment, the HMD 1120 may not detect an image (not shown) of the user from the image, which is taken from the viewing area 1140 of the camera 1130, at all. In other words, as shown in FIG. 8, the camera 1130 equipped in the HMD 1120 may not recognize the position of the reflector (not shown). For example, in this case, the user 1110 wearing the HMD 1120 may look around to find the reflector (not shown). If the reflector (not shown) is located near the user, the camera 1130 equipped in the HMD 1120 may recognize the position of the reflector (not shown). At this time, the HMD 1120 may provide a notice 1160 indicating that the image of the user cannot be detected. In this case, the notice 1160 may represent a direction or distance to which the user 1110 should move (rotate) towards the reflector (not shown).

According to the embodiment of FIG. 11, even though the HMD 1120 cannot detect at least a part of the image of the user, or even though there is no reflector (not shown) within the viewing area 1140, the HMD 1120 may perform video communication by moving (rotating) towards the reflector (not shown).

Figure 12:
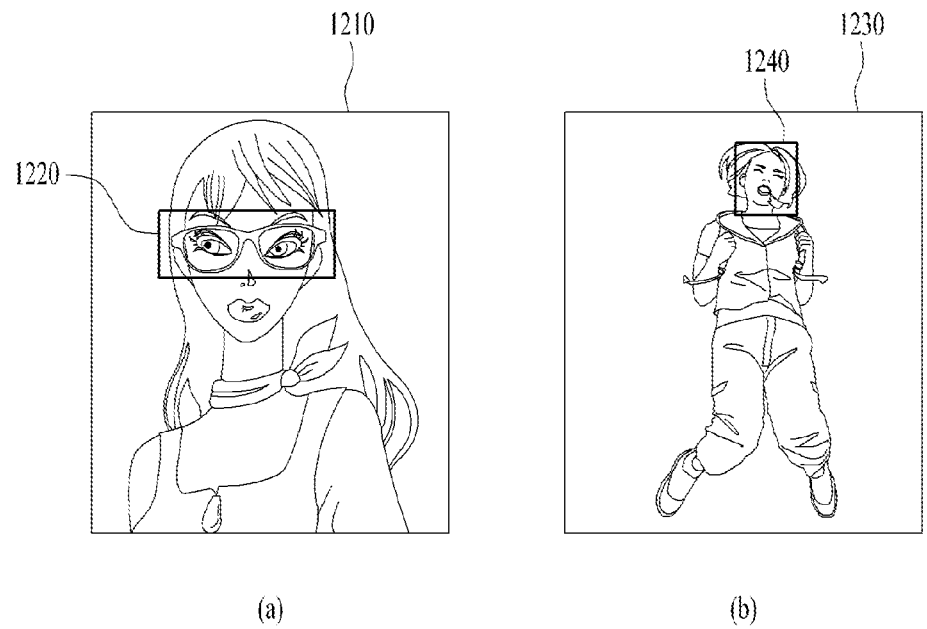
FIG. 12 is a diagram illustrating that an image of a video communication partner is detected.

FIG. 12 is a diagram illustrating that an image of a video communication partner is detected. In more detail, FIG. 12 illustrates that an image of a partner, which will correspond to a camera area of an HMD, is detected.

First of all, as described in FIG. 4, the HMD (not shown) may provide video communication interfaces 1210 and 1230 with an image of a partner to correspond to the position of a camera area (not shown) of the HMD.

In one embodiment, referring to FIG. 12(*a*), if an image of a recognized partner corresponds to a predetermined size range, the HMD (not shown) may allow an eye area 1220 of the image of the partner to correspond to the position of the camera area of the HMD. In more detail, the HMD (not shown) may display the eye area 1220 of the image of the partner to be overlaid on the position of the camera area (not shown). In this case, the eye area 1220 may include a middle of the forehead, eyes, and eyebrows. Also, the predetermined size range may represent a range that a face length of the partner occupies at least ⅓ of a height of a video communication interface. For example, referring to FIG. 12(a), since the face length of the partner in the image of the partner occupies ⅓ of the height of the video communication interface 1210, the HMD may allow the eye area 1220 of the partner to correspond to the position of the camera area of the HMD. This is because that recognition of the eyes is easy if the face of the partner in the image of the partner is displayed with a great range. Accordingly, the HMD may allow the eye area of the image in the image of the partner to correspond to the camera area.

In another embodiment, referring to FIG. 12(b), the HMD (not shown) may allow a face area 1240 of the image of the partner to correspond to the camera area (not shown) if the recognized image of the partner does not correspond to a predetermined size range. In more detail, the HMD (not shown) may display the face area 1240 of the image of the partner to be overlaid on the position of the camera area (not shown). For example, the face area 1240 may include a face of the partner in the image of the partner. Also, the predetermined size range may represent a range that a face length of the partner occupies at least ⅓ of a height of a video communication interface. For example, referring to FIG. 12(b), since the face length of the partner in the image of the partner does not occupy ⅓ of the height of the video communication interface 1230, the HMD may allow the face area 1240 of the partner to correspond to the position of the camera area (not shown). This is because that it is easier to correspond the face area to the camera area as it is difficult to find the eyes if the face of the partner is displayed with a small range. Accordingly, the HMD allows the face area in the image of the partner to correspond to the position of the camera area.

Meanwhile, the HMD (not shown) may display the face area 1240 of the image of the partner in the video communication interface 1230 by enlarging the face area if the recognized image of the partner does not correspond to a predetermined size range. For example, referring to FIG. 12(b), the HMD may enlarge the face area 1240 of the image of the partner and display the enlarged face area in the video communication interface 1230, thereby enabling eye contact between the user and the video communication partner more easily.

Figure 13:
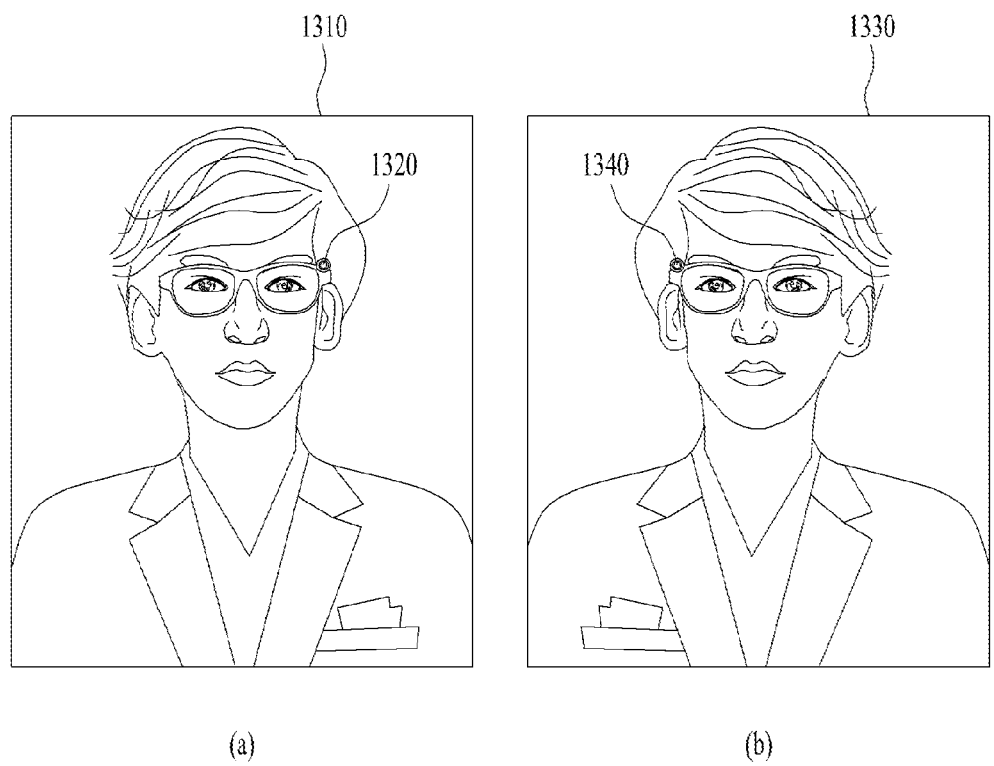
FIG. 13 is a diagram illustrating an example of a video communication image of a user, which is transmitted.

FIG. 13 is a diagram illustrating an example of a video communication image of a user, which is transmitted. In more detail, FIG. 13 illustrates a video communication image provided by reversing a taken image in left and right direction.

As described in FIG. 4, an HMD may provide a video communication image of a user by reversing a taken image in left and right direction. This is because that a camera of the HMD transmits an image of a user, which is taken using a reflector, to a video communication partner. In more detail, the HMD may use the image of the user, which is reflected in the reflector, as the video communication image. In other words, the HMD may allow the user to be located towards the image reflected in the reflector without orienting the camera towards the user. Also, since the image of the user reflected in the reflector is reversed in left and right direction as compared with the image taken by the camera oriented towards the user, the HMD may transmit the image taken by the camera to the video communication partner by reversing the image. However, the HMD may transmit the image of the user reflected in the reflector as it is or by being reversed in left and right direction depending on setting.

For example, referring to FIG. 13, if the image taken by the camera of the HMD corresponds to an image 1310 of FIG. 13(a), the video communication image of the user, which is transmitted from the HMD to the partner, may correspond to an image 1330 of FIG. 13(b). In more detail, in the taken image of FIG. 13(a), an image 1320 of the camera equipped in the HMD is located at the right side, whereas an image 1340 of the camera equipped in the HMD may be located at the left side in the video communication image of the user of FIG. 13(b). Also, in the taken image of FIG. 13(a), a handkerchief of the user is located at the right side, whereas a handkerchief of the user may be located at the left side in the video communication image of the user of FIG. 13(b).

Figure 14:
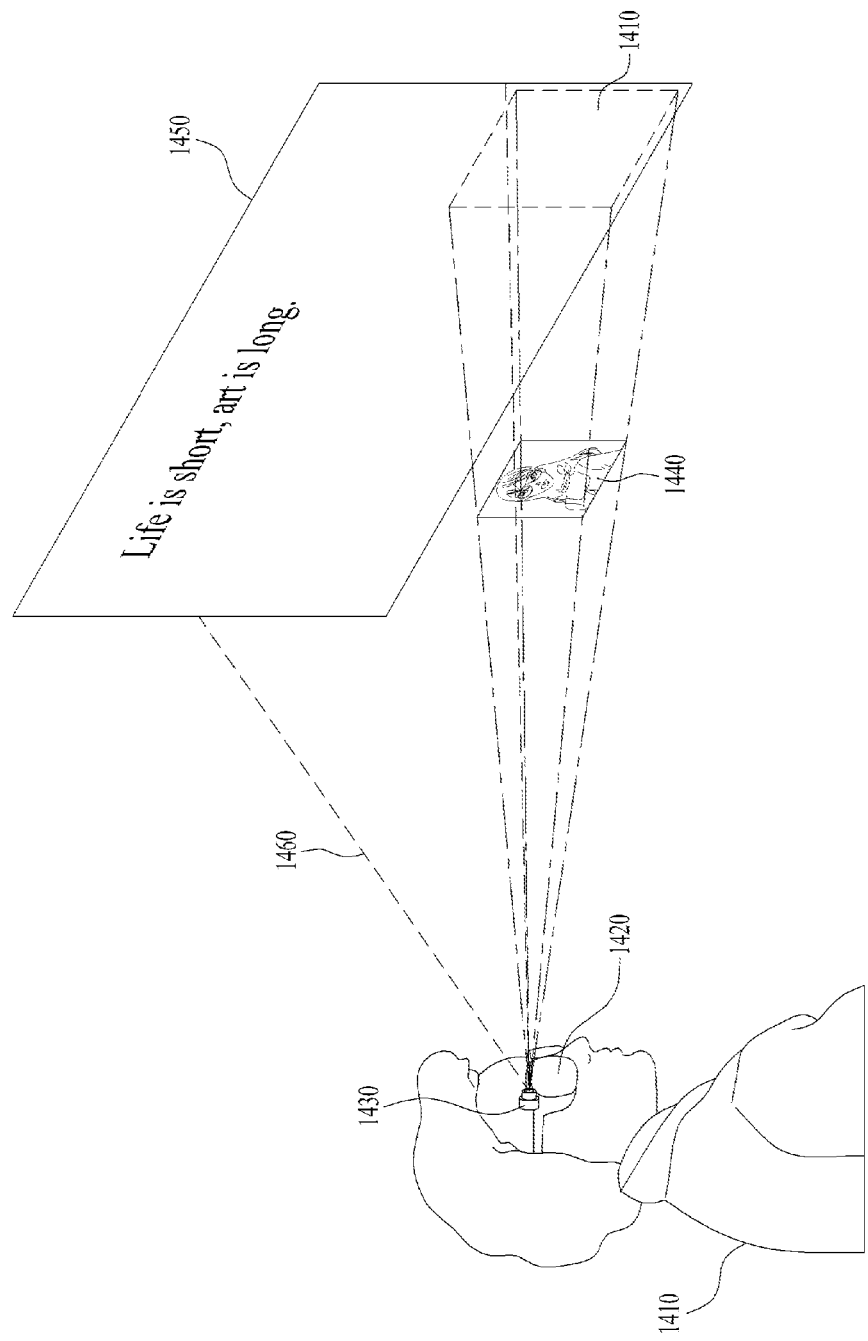
FIG. 14 is a diagram illustrating an example of video communication using a head mounted display.

FIG. 14 is a diagram illustrating an example of video communication using a head mounted display. In more detail, FIG. 14 illustrates that video communication is performed if an image of a user 1410 wearing an HMD 1420 is not displayed in a camera 1430 equipped in the HMD 1420.

First of all, the HMD 1420 may take a viewing area 1460 through the camera 1430. For example, referring to FIG. 14, a reflector does not exist in the viewing area 1460 of the camera 1430, and a blackboard that cannot project the image of the user 1410 may exist. This may correspond to a case where the user 1410 wearing the HMD 1420 performs video communication with a video communication partner while viewing the blackboard. This may also correspond to a case where the user 1410 wearing the HMD 1420 is oriented towards an object, to which the image of the user 1410 is not projected, not the blackboard. In this case, the HMD 1420 cannot detect the image of the user 1410 from the image, which is taken from the viewing area 1460.

Next, the HMD 1420 may receive video communication image data from a video communication partner (not shown) and recognize an image 1440 of the partner from the received video communication image data. Next, the HMD 1420 may provide a video communication interface 1450 which displays the image 1440 of the partner. Referring to FIG. 14, the HMD 1420 may display an image of the blackboard, which is viewed through the camera 1430 of the HMD 1420, in the video communication interface 1450 mainly. Also, the image 1440 of the video communication partner may be displayed in a predetermined position 1410 in a small range. In this case, the predetermined position 1410 may correspond to one of lower, upper, left and right sides of the video communication interface 1450. Accordingly, the HMD 1420 may perform video communication with the video communication partner (not shown) while transmitting an image which is viewed by the user 1410 through the camera 1430, to the video communication partner. Referring to FIG. 13, the HMD 1420 may transmit an image, which includes 'Life is short, art is long' taken by the camera 1430, to the video communication partner (not shown).

According to the embodiment of FIG. 14, the user may perform video communication with the video communication partner while sharing a scene, which is being viewed by himself/herself, with the video communication partner.

Figure 15:
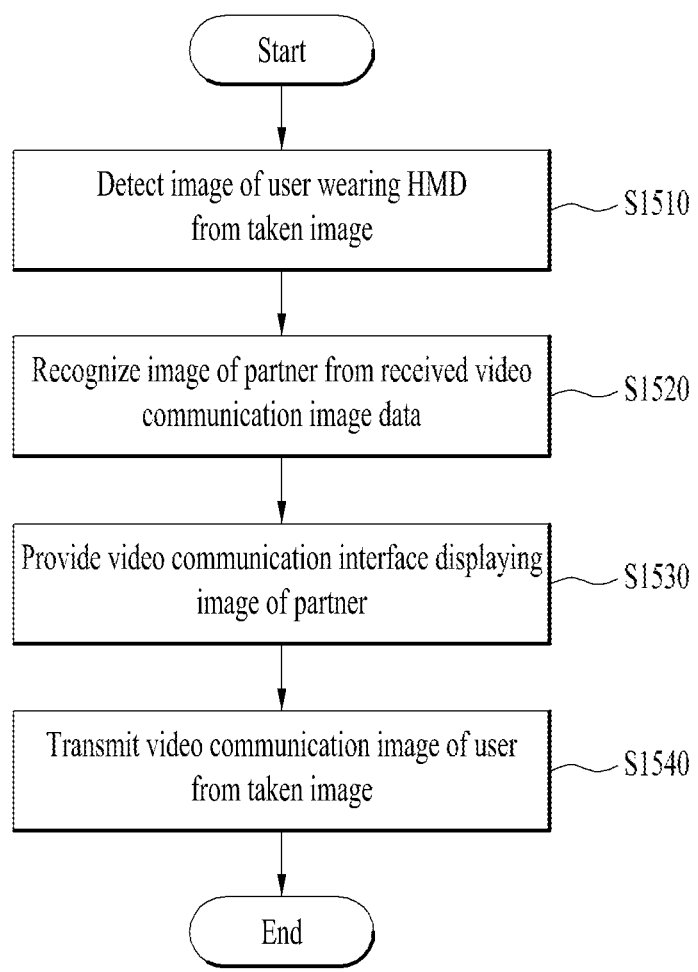
FIG. 15 is a flow chart illustrating a method of video communication using a head mounted display.

FIG. 15 is a flow chart illustrating a method of video communication using a head mounted display. Hereinafter, each step of FIG. 15 may be controlled by the processor 140 of the HMD 100 shown in FIG. 1.

First of all, the HMD may detect an image of a user wearing the HMD from a taken image (S1510). For example, the HMD may detect the image of the user wearing the HMD, which has certain definition, from the taken image. In this case, as described in FIG. 3, the image of the user may include a camera area of the HMD. Also, the HMD may detect the image of the user after, in the middle of, or before detecting the input signal of the user who desires to perform video communication or the input signal of the video communication partner.

Next, the HMD may recognize the image of the partner from the received video communication image data (S1520). As described in FIG. 4, the HMD may receive the video communication image data from the video communication partner before detecting the image of the user, after detecting the image of the user, or simultaneously with detecting the image of the user.

Next, the HMD may provide the video communication interface, which displays the image of the partner (S1530). As described in FIG. 4, the HMD may provide the video communication interface, which displays the image of the partner, so that the image of the partner may correspond to the position of the camera area of the HMD. For example, the HMD may provide the video communication interface, which displays the image of the partner, so that the eye area of the partner and the position of the camera area in the image of the user are displayed collinearly. For another example, the HMD may provide the video communication interface, which displays the image of the partner, so that the image of the partner may be overlaid on the position of the camera area. In this case, the image of the partner corresponding to the camera area of the HMD may include an eye area of the partner, a face area of the partner, and a middle of the forehead area of the partner. Also, as described in FIG. 4, the HMD may display the image of the partner and the video communication image of the user in the video communication interface at the same time.

Next, the HMD may transmit the video communication image of the user from the taken image (S1540). As described in FIG. 4, the video communication image of the user may correspond to the image reversed in left and right direction from the image of the user. Also, the order of the respective steps illustrated in FIG. 15 may be changed as the case may be.

Figure 16:
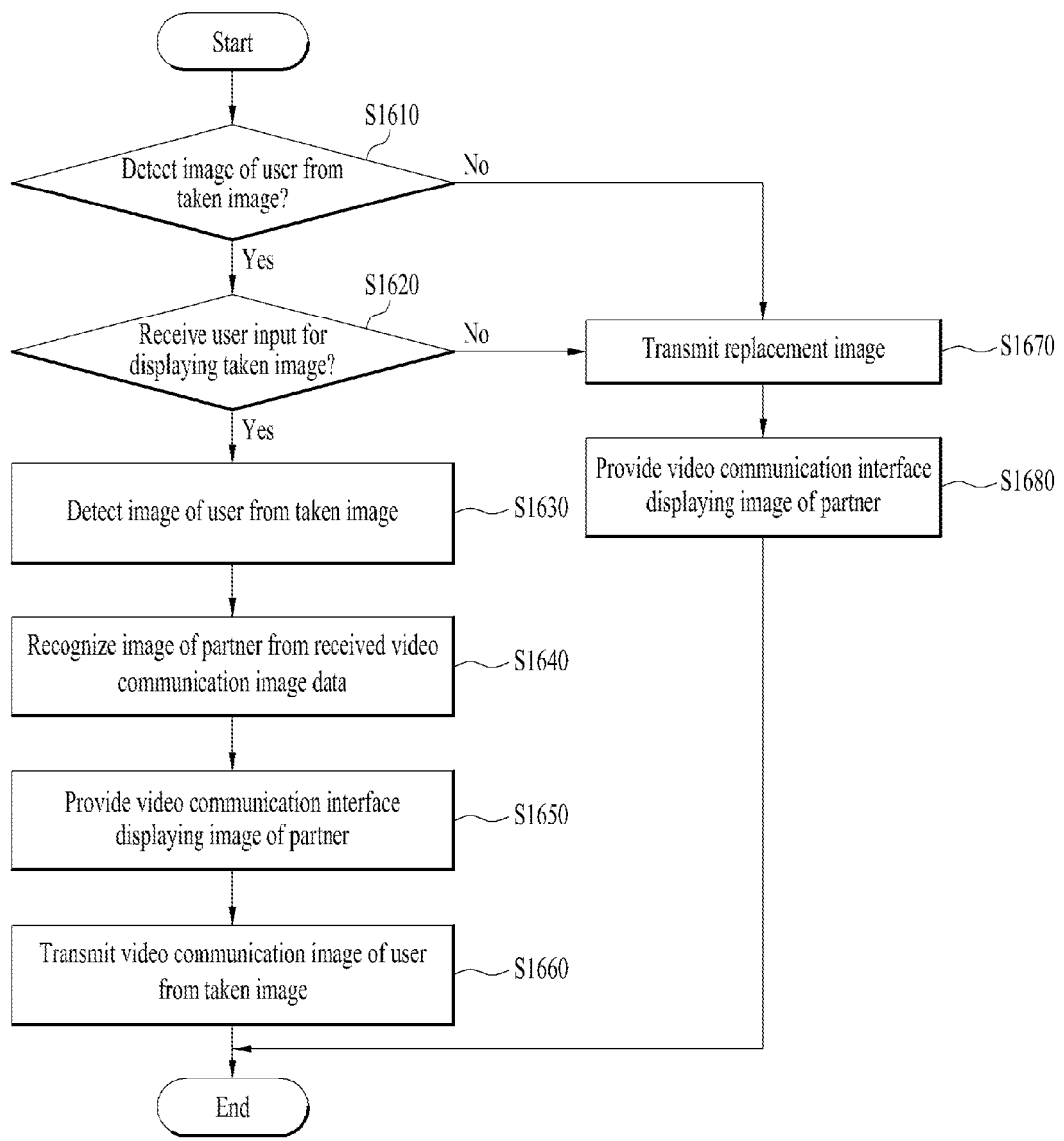
FIG. 16 is a flow chart illustrating another method of video communication using a head mounted display.

FIG. 16 is a flow chart illustrating another method of video communication using a head mounted display. Hereinafter, each step of FIG. 16 may be controlled by the processor 140 of the HMD 100 shown in FIG. 1. In the embodiment of FIG. 16, detailed description of the portions the same as or corresponding to the embodiment of FIG. 15 will be omitted.

First of all, the HMD may determine whether to detect an image of a user from a taken image (S1610). For example, as described in FIG. 3 and FIG. 5, a camera equipped in the HMD may detect at least a part of the image of the user from the taken image. Also, for example, as described in FIG. 7, the camera equipped in the HMD may not detect the image of the user at all.

At the step S1610, if the image of the user may be detected from the taken image, the HMD may detect whether a user input for displaying the taken image has been received (S1620). In other words, as described in FIG. 10, the HMD may determine whether to use the image taken by the user input or its replacement image as the video communication image before video communication starts or during video communication.

At the step S1620, if the user input for displaying the taken image is received, the HMD may detect the image of the user from the taken image (S1630). Next, the HMD may recognize the image of the partner from the received video communication image data (S1640). Next, the HMD may provide the video communication interface, which displays the image of the partner (S1650). Next, the HMD may transmit the video communication image of the user from the taken image (S1660).

Meanwhile, when the HMD cannot detect the image of the user from the taken image at the step S1610 and when the HMD does not receive the user input for displaying the taken image at the step S1620, the HMD may transmit the replacement image to the video communication partner (S1670). As described in FIG. 9, the replacement image may include an image of a user, which is previously stored, and an image of an entertainer. Also, as described in FIG. 11, if at least a part of the camera area of the HMD is not detected from the taken image, the HMD may provide a notice indicating that at least a part of the camera area is not detected.

Next, the HMD may provide a video communication interface, which displays the image of the partner (S1680). As described in FIG. 9, the HMD may together display the image of the partner and the replacement image in the video communication interface. Also, the order of the respective steps illustrated in FIG. 15 may be changed as the case may be.

Moreover, although the description may be made for each of the drawings, the embodiments of the respective drawings may be incorporated to achieve a new embodiment. A computer readable recording medium where a program for implementing the embodiments is recorded may be designed in accordance with the need of the person skilled in the art within the scope of the present disclosure.

The head mounted display and the method of video communication using the same according to the present disclosure are not limited to the aforementioned embodiments, and all or some of the aforementioned embodiments may selectively be configured in combination so that various modifications may be made in the aforementioned embodiments.

Meanwhile, the method of video communication using the head mounted display according to the present disclosure may be implemented in a recording medium, which can be read by a processor provided in the network device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present disclosure can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

In this specification, both the product invention and the method invention have been described, and description of both inventions may be made complementally if necessary.

What is claimed is:

1. A head mounted display (HMD) comprising:
a display unit configured to output an image;
a communication unit configured to transmit and receive video communication image data;
a camera unit configured to take an image in a forward direction of the HMD; and
a processor configured to control the display unit, the communication unit and the camera unit,
wherein the processor is further configured to:
detect an image of a user wearing the HMD from the taken image, wherein the image of the user is a reflected image in a reflector and includes a camera area of the HMD, and wherein the camera area includes at least one of a reflected image of the camera unit, a reflected image of the HMD and a reflected image of a middle of the user's forehead, recognize an image of a partner from the received video communication image data, provide a video communication interface displaying the recognized image of the partner, wherein the video communication interface displays the recognized image of the partner corresponding to a position of the camera area of the HMD, and transmit a video communication image of the user from the taken image, wherein, when a size of the recognized image of the partner is within a predetermined size range, the processor is configured to display an eye area in the recognized image of the partner corresponding to the position of the camera area of the HMD.

2. The HMD according to claim 1, wherein the transmitted video communication image of the user includes an image reversed in left and right direction from the taken image.

3. The HMD according to claim 1, wherein the image of the user includes an image detected within a viewing area of the HMD.

4. The HMD according to claim 1, wherein the processor is configured to display the video communication interface so that the recognized image of the partner is overlaid on the position of the camera area of the HMD.

5. The HMD according to claim 1, wherein the processor is configured to display the video communication interface so that the recognized image of the partner and the position of the camera area of the HMD are located in the same direction within a viewing area of the HMD.

6. The HMD according to claim 1, wherein, when at least a part of the camera area is not detected from the taken image, the processor is further configured to provide a notice indicating that at least a part of the camera area of the HMD is not detected from the taken image.

7. The HMD according to claim 6, wherein the notice represents at least one of a direction and a distance to which the camera area of the HMD should move to be detected.

8. The HMD according to claim 1, wherein, when the image of the user wearing the HMD is not detected from the taken image, the processor is further configured to transmit a replacement image.

9. The HMD according to claim 1, wherein the processor is further configured to provide a video communication image determination interface that determines whether to transmit the taken image or a replacement image.

10. The HMD according to claim 1, wherein the video communication image of the user includes at least one of the image of the user wearing the HMD and a replacement image.

11. The HMD according to claim 1, wherein the processor is configured to display the recognized image of the partner and the video communication image of the user together in the video communication interface.

12. The HMD according to claim 1, wherein, when the image of the user wearing the HMD is not detected from the taken image, the processor is configured to display the image taken by the camera unit of the HMD and the recognized image of the partner in the video communication interface.

13. The HMD according to claim 1, wherein the video communication image of the user includes a peripheral area including the camera area of the HMD in the taken image.

14. The HMD according to claim 1, wherein, when the size of the recognized image of the partner is not within the predetermined size range, the processor is configured to display a face area in the recognized image of the partner corresponding to the position of the camera area of the HMD.

15. The HMD according to claim 1, wherein, when the size of the recognized image of the partner is not within the predetermined size range, the processor is configured to enlarge the recognized image of the partner and display the enlarged image in the video communication interface.

16. The HMD according to claim 1, wherein the processor is further configured to control at least one of a position and a depth of the video communication interface.

17. The HMD according to claim 16, wherein the position of the video communication interface is determined based on the size of the recognized image of the partner.

18. The HMD according to claim 16, wherein the position of the video communication interface is determined based on a setting of the user.

19. A method of video communication using a head mounted display (HMD), the method comprising:

detecting an image of a user wearing the HMD, from an image taken by a camera unit in a forward direction of the HMD, wherein the image of the user is a reflected image and includes a camera area of the HMD, and wherein the camera area includes at least one of a reflected image of the camera unit, a reflected image of the HMD and a reflected image of a middle of the user's forehead;

recognizing an image of a partner from received video communication image data;

providing a video communication interface displaying the recognized image of the partner, wherein the video communication interface displays the recognized image of the partner corresponding to a position of the camera area of the HMD; and transmitting a video communication image of the user from the taken image, wherein, when a size of the recognized image of the partner is within a predetermined size range, the video communication interface displays an eye area in the recognized image of the partner corresponding to the position of the camera area of the HMD.

* * * * *